US010940380B2

(12) United States Patent
Beaver et al.

(10) Patent No.: US 10,940,380 B2
(45) Date of Patent: Mar. 9, 2021

(54) FAST-ROPE TRAINING APPARATUS

(71) Applicant: Beaverfit Limited, Church Stretton Shropshire (GB)

(72) Inventors: Richard James Beaver, Church Stretton (GB); Thomas Edward Beaver, Church Stretton (GB)

(73) Assignee: Beaverfit Limited, Shropshire (GB)

( * ) Notice: Subject to any disclaimer, the term of this patent is extended or adjusted under 35 U.S.C. 154(b) by 16 days.

(21) Appl. No.: 16/312,708

(22) PCT Filed: Jun. 21, 2017

(86) PCT No.: PCT/GB2017/051822
§ 371 (c)(1),
(2) Date: Dec. 21, 2018

(87) PCT Pub. No.: WO2017/221013
PCT Pub. Date: Dec. 28, 2017

(65) Prior Publication Data
US 2019/0168092 A1 Jun. 6, 2019

(30) Foreign Application Priority Data
Jun. 22, 2016 (GB) .................................... 1610911

(51) Int. Cl.
*A63B 69/00* (2006.01)
*E04H 12/00* (2006.01)
(Continued)

(52) U.S. Cl.
CPC .......... *A63B 69/0048* (2013.01); *A63B 17/00* (2013.01); *A63B 17/02* (2013.01);
(Continued)

(58) Field of Classification Search
CPC ..... A63B 17/00; A63B 17/02; A63B 69/0048; A63B 71/02; E04H 12/00; E04H 2001/1283; G09B 9/003; G09B 19/0038
See application file for complete search history.

(56) References Cited

U.S. PATENT DOCUMENTS 5,667,267 A * 9/1997 Talucci ..................... B60P 3/14
296/26.15
6,357,550 B1 * 3/2002 Willson ................ E04H 1/1205
182/131
(Continued)

FOREIGN PATENT DOCUMENTS

CN 2768112 Y 3/2006
DE 20 2011 103 114 U1 12/2012
(Continued)

OTHER PUBLICATIONS

AirSource Military, Aug. 27, 2014, "Air Guardsman—Rapelling and Fast Rope Use", youtube.com, [online], Available from: https://www.youtube.com/watch?v= YoeBY4nSzuQ [Accessed Sep. 26, 2016] See whole video, especially 3:00 to 3:40.
(Continued)

*Primary Examiner* — Joshua Lee
(74) *Attorney, Agent, or Firm* — Fay Sharpe LLP

(57) ABSTRACT

A training apparatus for fast-rope training includes a platform-supporting structure having one or more containers and at least one platform configured for use in fast-rope training. At least one attachment is provided for attaching a fast-rope. The platform-supporting structure is supportable by a surface. The at least one attachment Is located higher than the platform and spaced laterally from the platform-supporting structure such that the at least one attachment overhangs the surface so a fast rope can hang from the at least one attachment, past the platform and toward the surface.

17 Claims, 14 Drawing Sheets

(51) Int. Cl.
*G09B 19/00* (2006.01)
*A63B 17/02* (2006.01)
*G09B 9/00* (2006.01)
*A63B 17/00* (2006.01)
*A61B 17/00* (2006.01)
*E04H 1/12* (2006.01)

(52) U.S. Cl.
CPC ............ *E04H 12/00* (2013.01); *G09B 9/003* (2013.01); *G09B 19/0038* (2013.01); *E04H 2001/1283* (2013.01)

(56) References Cited

U.S. PATENT DOCUMENTS

| | | | | |
|---|---|---|---|---|
| 6,799,975 | B1* | 10/2004 | Dunn | G09B 19/00 434/219 |
| 7,244,123 | B1* | 7/2007 | Barron | G09B 9/00 220/562 |
| 7,931,564 | B1* | 4/2011 | Wu | A63B 69/0048 482/35 |
| 8,016,686 | B2* | 9/2011 | Liggett | A63G 33/00 182/36 |
| 9,016,001 | B2* | 4/2015 | Heger | E04B 1/34357 52/79.5 |
| 9,295,871 | B2* | 3/2016 | Luedeka | A63B 21/4023 |
| 9,750,999 | B2* | 9/2017 | Monaco | E04H 3/14 |
| 10,105,564 | B2* | 10/2018 | Garland | A63B 9/00 |
| D845,406 | S* | 4/2019 | Gilchrist | D21/686 |
| 2002/0185049 | A1* | 12/2002 | Broderick | A63H 23/10 114/264 |
| 2006/0090960 | A1* | 5/2006 | Liggett | A62B 35/0056 182/36 |
| 2006/0101727 | A1* | 5/2006 | Holgerson | A62C 99/0081 52/79.1 |
| 2006/0135272 | A1* | 6/2006 | Liggett | A63G 31/02 472/92 |
| 2006/0258511 | A1* | 11/2006 | Postma | A63B 69/0048 482/35 |
| 2007/0113487 | A1* | 5/2007 | Warminsky | E04H 9/10 52/79.1 |
| 2007/0117503 | A1* | 5/2007 | Warminsky | E04H 9/10 454/187 |
| 2007/0191123 | A1* | 8/2007 | Liggett | A63G 31/02 472/15 |
| 2009/0282749 | A1* | 11/2009 | Warminsky | E04H 9/10 52/79.1 |
| 2011/0023925 | A1* | 2/2011 | Johnson | E04H 15/46 135/139 |
| 2012/0118668 | A1* | 5/2012 | Ernstsen | E04H 12/00 182/107 |
| 2012/0144762 | A1* | 6/2012 | Eatock | G09B 19/00 52/79.5 |
| 2014/0259978 | A1* | 9/2014 | Walton | H01Q 1/12 52/79.8 |
| 2015/0014212 | A1* | 1/2015 | Beaver | A63B 23/0458 206/579 |
| 2015/0059257 | A1* | 3/2015 | Beaver | A63B 71/02 52/27 |
| 2016/0059104 | A1* | 3/2016 | Monaco | E04H 3/14 280/30 |
| 2017/0095743 | A1* | 4/2017 | Gustafson | A63G 21/22 |
| 2017/0136278 | A1* | 5/2017 | Gilchrist | A63B 17/00 |

FOREIGN PATENT DOCUMENTS

| | | |
|---|---|---|
| NL | 2 016 058 A | 3/2016 |
| WO | WO 2010/133260 A1 | 11/2010 |
| WO | WO 2014/177880 A2 | 11/2014 |

OTHER PUBLICATIONS

BeaverFit, 2010-2016, "BeaverFit Training Equipment", beaverfiteu.com, [online], Available from:https://web.archive.org/web/201605111 74256/http://www.beaverfiteu.com/ [Accessed Sep. 26, 2016] Applicant's prior art. See Operational Lockers—Custom Lockers.
U.K. Search Report of British Application No. GB1610911.8 dated Sep. 28, 2016, 4 pages.
International Search Report and Written Opinion of International Application No. PCT/GB2017/051822 dated Sep. 13, 2017, 9 pages.

* cited by examiner

FAST-ROPE TRAINING APPARATUS

BACKGROUND

The present invention relates to a fast-rope training apparatus, particularly a tower for fast-rope training.

Fast-roping is a technique used primarily by military and emergency service personal in order to lower personnel at a height (such as in a hovering helicopter) to a lower level (such as the ground). In fast-roping, a rope suitable for fast-roping is hung toward the ground, a user is attached to the rope and a user lowers themselves to the ground under gravity and controls their speed, usually with their hands.

As this is a high-risk and high-skilled operation, the user requires significant training to ensure they can safely perform fast-roping. Current training facilities are inadequate, expensive and complex. One such training facility comprises a large permanent building, such as a hanger. A fast-rope training apparatus has been constructed inside the building, making use of the structure of the building, such as the building's beams, to support the apparatus. This fast-rope training apparatus is made bespoke to fit inside the building and is therefore of no use for mass-production. Further, it is expensive and time consuming to design and erect.

The present invention addresses these issues, and provides other significant advantages as is clear from the following description.

BRIEF SUMMARY

In one aspect, the present invention provides a fast-rope training apparatus comprising a platform-supporting structure comprising one or more containers; at least one platform configured for use in fast-rope training; and at least one attachment for attaching a fast-rope, wherein the platform-supporting structure is supportable by a surface, and wherein the at least one attachment is located higher than the platform and spaced laterally from the platform and/or platform-supporting structure such that the at least one attachment overhangs the surface, and possibly also the platform, so a fast-rope can hang from the at least one attachment, past the platform and toward the surface.

In another aspect, the present invention provides a fast-rope training apparatus comprising a platform-supporting structure comprising one or more containers; at least one platform configured for use in fast-rope training; wherein the platform-supporting structure is supportable by a surface, and wherein the at least one platform extends outward from the platform-supporting structure such that the at least one platform overhangs the surface.

This training apparatus may comprise at least one attachment for attaching a fast rope. The attachment may be located higher than the platform.

The attachment may be spaced laterally from the platform (and the platform-supporting structure). In this way, the at least one attachment may overhang the surface (but not the platform) so a fast-rope can hang (at least substantially vertically) from the at least one attachment, past the platform and toward the surface.

Alternatively, the attachment may be spaced laterally from the platform-supporting structure (and preferably vertically above the platform) such that the at least one attachment overhangs the platform (and the surface) so a fast-rope can hang (at least substantially vertically) from the at least one attachment, past/through the platform (e.g. a through a hatch in the platform, see below) and toward the surface.

The attachment and the platform may preferably be arranged so that there would be no contact between the rope and the platform as the rope hangs (in its natural state) from the attachment.

Alternatively, the attachment may be spaced laterally from the platform-supporting structure (and preferably vertically above the platform) such that the at least one attachment overhangs the platform (and the surface) so a fast-rope can hang at least partially vertically from the at least one attachment to an edge of the platform, past the platform, and then substantially vertically from the edge of the platform to the surface.

In this case, for example, the fast rope may contact the platform.

The present invention provides a simple and cheap fast-rope training apparatus. In the prior art, fast-rope training is performed using training equipment with a complex set up: the training equipment is supported by the structure of a permanent building and so the training equipment has to be designed and configured to fit around and be supported by the structure of the permanent building. In contrast, the platform-supporting structure may provide the sufficient height for the fast-rope training in a simple and cost-effective manner, and removes the need for the training apparatus to be supported by a permanent building (or any other structure). Further, the nature of the containers allows the training apparatus to be semi-transportable, i.e. when there is a plurality of the containers, they may be "unstacked" and transported to another location where they are "restacked" to form the platform-supporting structure/training apparatus. The training equipment of the prior art is not transportable at all—in order to transport it, it would require a complete disassembly of the entire training equipment.

The platform-supporting structure may consist of one or more containers. The platform-supporting structure may be formed of a plurality of containers arranged in a stack. In this case, the platform-supporting structure may be a stack. The stack may comprise or consist of a stack of containers.

When a plurality of containers form the stack, the training apparatus may be a tower for fast-rope training.

When stacked, the containers may be secured to each other. Further, the lower-most structure may be arranged to rest on the surface (e.g. under gravity), or to be secured to the surface.

The platform-supporting structure may be of such a height such that it is useful and suitable for fast-rope training. The platform-supporting structure may be at least 4 m, preferably at least 6 m, preferably at least 7 m, preferably less than 15 m, preferably less than 10 m, preferably 4-15 m, preferably 7-10 m high. The training apparatus as a whole may be at least 8 m, preferably at least 10 m, preferably less than 15 m, preferably less than 12 m, preferably 8-15 m, preferably 10-12 m high.

A platform may be configured for use in fast-rope training if it is provided with suitable equipment on or in the vicinity of the platform. For instance, to perform fast-roping, suitable attachments (such as bars and/or hooks and/or loops) may be required for attaching a rope, or indeed a suitable rope may be required. Such attachments must be capable of supporting the weight of a user, e.g. capable of supporting vertical loads of at least 50 kg, 100 kg, 150 kg or 200 kg. Further, suitable access to the edge of the platform may be required (such as a gate or hatch). Further, the platform may be required to be of a certain height above the ground, such as at least 1 m, preferably at least 5 m, preferably at least 8 m, preferably less than 15 m, preferably less than 12 m, preferably less than 10 m, preferably 1-15 m, preferably 5-12 m, preferably 8-10 m. Further, a platform may be configured for use in fast-rope training if there is a free vertical path between the platform and the surface (e.g. there is nothing in the way of a user that fast-ropes from the platform to the surface). Further, a platform may be configured for us in fast-rope training if the surface of the platform is generally flat/horizontal and provides enough space for at least 1, 2 or 3 users to stand and move comfortably in the vicinity of the rope or the platform edge. Such an area may be at least 2 m$^2$, 4 m$^2$, 6 m$^2$, 8 m$^2$, or 10 m$^2$. The platform edge local to the rope may be at least 0.5 m, 1 m, 2 m or 3 m long. The platform is preferably generally rectangular in shape.

The surface may be a ground surface, and the surface is preferably flat/horizontal. The platform-supporting structure may be directly supportable (e.g. in direct contact with) or indirectly supportable (e.g. with an element, such as a trailer (with wheels), in between the platform-supporting structure and the ground surface) by the ground surface.

The at least one attachment may overhang the surface (and possibly the platform) in such a way that a fast-rope can hang past/through/by the platform within a user's arm's reach of the edge of the platform, e.g. less than 1 m or 0.5 m from the edge of the platform.

The at least one attachment may overhang the surface (and possibly the platform) in such a way that a fast-rope can hang from the attachment means such that when it is used by a user there is no (or very little) risk of the user hitting the platform-supporting structure. For example, the attachment means may overhang the surface by at least 0.5 m, preferably 1 m, preferably 1.5 m, preferably 2 m, preferably 2.5 m, with respect to the nearest lateral side of the platform-supporting structure and/or platform (when viewed from vertically above).

The "overhang" mentioned in this disclosure is overhang when viewed from vertically above the training apparatus. An overhang should be considered to be when one element (such as the attachment) is spaced laterally outward from a lateral periphery of a second element (such as the platform-supporting structure) such that it is vertically above a third element (such as the surface or the platform). In this case, in consistent usage with the term "overhang" as used in this specification, the first element overhangs the third element, with respect to the second element. When the attachment overhangs the surface it may or may not also overhang the platform, e.g. it may overhang the surface only when it is vertically above the surface but not vertically above the platform, or it may overhang both the surface and the platform when it is vertically above the platform and the surface. Preferably, there is nothing vertically between the platform (or at least the peripheral lateral edge of the platform past which the rope may hang) and the surface to affect the path of the rope, or to affect/prevent the user from fast-roping between the platform and the rope.

The training apparatus may comprise at least one rope for use in fast-roping. The rope may hang (at least substantially vertically) from the attachment. The rope may pass by the platform within a user's arm's reach (of the edge of the platform). The rope may pass through the platform within a user's arm's reach (of the edge of the platform, which may be an edge of the hatch). In cases where the attachment overhangs the platform (e.g. the attachment is vertically above the platform) the fast-rope may hang non-vertically from the attachment until it contacts the platform (such as an edge of the platform or a skid—see below) and then may hang vertically from the platform toward the surface. In cases where the attachment overhangs the platform (e.g. the attachment is vertically above the platform) the fast-rope may hang substantially vertically from the attachment through the platform (e.g. via a hatch, see below) and then may hang vertically from the platform toward the surface.

There may be a plurality of attachments. Any combination of the position of attachments with respect to the platform mentioned above is possible. A rope for use in fast-roping may be attached to each of the attachments.

The one or more containers may (each) be a transportable structure, such as a transportable cabin. The transportable structure may be loadable onto a trailer of a lorry for example. The one or more containers may be cheap and readily available, and may simplify construction and deployment of the training apparatus. This is particularly advantageous over the prior art where training equipment is secured to a permanent building in a complex manner. The present solution is therefore much cheaper, and more transportable. For example, the present training apparatus could be quite straightforwardly temporarily erected in a training ground, e.g. in a military base. The present invention could subsequently be easily moved to any appropriate location. Further, the present training apparatus could be constructed in a modular form and transported to a desired location where it is then erected. This modular construction would greatly ease erection of the training apparatus.

Thus, the training apparatus may preferably have a modular construction. The modules may be the one or more containers, and may also include the top training apparatus assembly (see below).

Preferably, the one or more containers are pre-fabricated containers. Just because a container is described as "pre-fabricated", it does not mean that absolutely no fabrication/modification of the container is possible. Rather, a pre-fabricated container may be one that has its own structural integrity prior to construction of the platform-supporting structure, such as an ISO container or a portable building (such as a porta-cabin) or any similar pre-fabricated structure. Thus, a pre-fabricated container may be one in which the components of the container, such as the walls, roof and floor, are secured to one another such that the container may be considered to be one modular element. Further, a pre-fabricated structure may be one that can be sourced/purchase in an off-the-shelf manner, rather than requiring specific construction steps by the constructor of the training apparatus.

Preferably, the one or more containers comprise one or more ISO shipping containers. These may be 10' (3 m), 20' (6.1 m) or 40' (12.2 m) ISO shipping containers. These are length measurements. Preferably, the 20' ISO shipping container is used. ISO shipping containers are typically around 8' (2.4 m) wide and 8-10' (2.4-3.0 m) high. ISO shipping containers provide many advantages. For instance, they are strong enough for stacking without significant (or any) structural reinforcement. Further, they are durable. Further, they are cheap and readily available. Further, they are easily transportable. Further, they are easily modified to include the additional features of the present invention (e.g. since they are typically made from metal, and since this metal is easily worked with). Preferably, the/each container is an ISO container.

Preferably, each container has substantially the same dimensions. Preferably, each container has substantially the same width and length dimensions. Preferably, each container has substantially the same height dimension. This allows the containers to be easily stacked to form the platform-supporting structure.

Preferably the/each container is cuboid-shaped.

Preferably, the platform-supporting structure has a substantially vertical wall below the platform. Preferably all of the walls of the platform-supporting structure are substantially vertical. It is advantageous not to have the base of the platform-supporting structure wider than the top as this would mean a long platform is needed in order to achieve the platform's overhang of the surface. However, it is advantageous not have the base narrower than the top of the platform-supporting structure as this would lead to a potentially unstable platform-supporting structure. The wall may be formed of the respective walls of the one or more containers.

The training apparatus may be free-standing. Thus, the training apparatus may be arranged such that it does not require structural support from any other structure/building. This is advantageous as it allows the training apparatus to be erected in any suitable location. The prior art training equipment discussed above, on the other hand, requires the training equipment to be structurally supported by a permanent building structure. This severely limits the locations in which the training equipment can be erected, and severely increases its complexity.

The platform-supporting structure may comprise an uppermost portion. The at least one platform may comprise an uppermost portion-level platform at substantially the same height as the uppermost portion. This location is desirable as it allows the uppermost portion-level platform to be supported on the platform-supporting structure whilst allowing the maximum possible distance between the platform and the surface, which is beneficial for fast-rope training. The uppermost portion of the platform-supporting structure may be the top of the top container (or the only container), such as the top surface (e.g. the roof) of the top container (or the only container). The uppermost portion-level platform may extend laterally outward from the uppermost portion of the platform-supporting structure, such that it overhangs the surface. Said platform may be located at an end of the platform-supporting structure (with respect to the length of the one or more containers).

The training apparatus may comprise a plurality of uppermost portion-level platforms. Preferably there are two (only). Each of said platforms may be located at opposite respective ends of the platform-supporting structure (with respect to the length of the one or more containers). Preferably, these are at substantially the same height as each other.

The at least one platform may also comprise a platform at a location above the uppermost portion of the platform-supporting structure, e.g. a platform that is held above the uppermost portion of the platform-supporting structure by a frame. The frame may comprise one or more substantially vertically oriented bars. The frame may extend from the platform-supporting structure. This frame and platform may be or may be part of the top training apparatus assembly discussed below. It may be a module (preferably a prefabricated module) that can be installed and removed from the platform-supporting structure.

Additionally/alternatively, at least one of the one or more containers may comprise a floor. The at least one platform may comprise a floor-level platform at substantially the same height as said floor. Said container may preferably be the top container of the platform-supporting structure. Said container may be second container from the top. Said container may be any of the containers in the platform-supporting structure other than the bottom container. This location of platform allows a lower training height to be used, which can be advantageous for progressive learning/training. Further, this location of platform allows the floor of said container to be used as the platform, to support the platform and/or to allow access to the platform. The platform may extend from the floor at substantially the same height as the floor, such that it overhangs the surface. Said platform may be located at an end of the platform-supporting structure (with respect to the length of the one or more containers).

The floor-level platform may be vertically below the uppermost-level platform. Preferably the floor-level platform and the uppermost-level platform extend laterally outward from the same end of the platform-supporting structure, and extend in the same direction.

Preferably the uppermost-level platform extends further from the platform-supporting structure than the floor-level platform. This allows users to fast-rope from both platforms at the same time without interfering with each other.

The floor-level platform may have a length equal to the width of the platform-supporting structure.

The training apparatus may comprise a plurality of floor-level platforms. Preferably there are two (only). Each of said platforms may be located at opposite respective ends of the platform-supporting structure (with respect to the length of the one or more containers). Preferably, these are at substantially the same height as each other.

The floor-level platform may equally be thought of as a roof-level platform, level with the roof of the container immediately below the platform. In this case, said platform has substantially the same height as the roof of the container. The container in question may be the second container from the top, the third container from the top, or the bottom container, Said container may be any of the containers except the top container. The platform may extend from the roof at substantially the same height as the roof, such that it overhangs the surface. Said platform may be located at an end of the platform-supporting structure (with respect to the length of the one or more containers).

The roof-level platform may be vertically below the uppermost-level platform (see below). Preferably the roof-level platform and the uppermost-level platform extend laterally outward from the same end of the platform-supporting structure, and extend in the same direction.

Preferably the uppermost-level platform extends further from the platform-supporting structure than the roof-level platform. This allows users to fast-rope from both platforms at the same time without interfering with each other.

The training apparatus may comprise a plurality of roof-level platforms. Preferably there are two (only). Each of said platforms may be located at opposite respective ends of the platform-supporting structure (with respect to the length of the one or more containers). Preferably, these are at substantially the same height as each other.

Whether the platform is thought of as a roof-level platform or a floor-level platform may come down to preference of the given situation. However, it should be understood that these two platforms are at least substantially similar, and may be equivalent in many situations.

The external wall of the platform-supporting structure may comprise a door for accessing the platform. Preferably, the door may be the external wall of one of the one or more containers. The door may be in the end wall of the container. The door may be adjacent to the platform. The door may be a roller door. The door may be configured such that when the door is shut, the external wall of the container/platform-supporting structure is substantially completely closed. The door may be configured such that when the door is open, the end wall of the container is substantially completely open. When the door is in a wall of a container, the platform is preferably the floor-level platform of that container (or roof-level platform of the container below).

The platform may be moveable between a deployed position (e.g. ready for use) and a retracted position (e.g. ready for assembly/disassembly of the training apparatus and transportation of the one or more containers). The moveable portion may be the portion of the platform that overhangs the surface. The movement may be a hinging/pivoting movement. The platform may be attached to one of the one or more containers via a hinge. Preferably, the hinge/pivot is orientated horizontally and extends parallel to the wall of the container and is arranged such that the platform may pivot downwards to a horizontal deployed position and upwards to a vertical retracted position (e.g. for a floor-level platform). The hinge may alternatively be arranged such that the platform may pivot upwardly to its deployed position and downwardly to its vertical retracted position (e.g. for a roof-level platform). When in the vertical retracted position the platform may be substantially flush with, or at least substantially parallel to and adjacent to, the outside of the container/platform-supporting structure. The platform may comprise a stay or brace or strut configured to maintain the platform in the deployed position, e.g. to act against vertical downward loads on the platform to ensure the platform is maintained in the deployed (horizontal) position.

Additionally/alternatively, the platform-supporting structure may comprise an external wall. The at least one platform may comprise an external wall platform that is attached to and supported by the external wall. The external wall of the platform-supporting structure may preferably be a substantially vertical wall, and may be made from external walls of the one or more containers. The platform may be attached to the external wall and extend horizontally therefrom. The platform may also be supported by the surface, preferably via at least partially vertical supporting member(s). The platform may preferably be attached to the bottom container. This lower height is preferable as it allows for easier and safer demonstrations and learning. Said platform may be located on a side wall (as opposed to an end wall, with respect to the length of the one or more containers).

The platform may extend with a horizontal length less than or equal to the length of the platform-supporting structure/one or more containers.

Between the platform and the ground surface there may extend a wall, preferably a vertical wall, which may be used for climbing.

The training apparatus may comprise a plurality of external wall platforms. Preferably there are two (only). Each of said platforms may be located on opposite or the same side wall of the platform-supporting structure (with respect to the length of the one or more containers). Each may have substantially the same height or different heights.

The at least one platform may comprise at least one hatch. The hatch may allow a rope to pass through the platform, and may allow the user to fast-rope through the platform. The hatch may be hinged to the remainder of the platform. The hatch may have an area of at least 0.5 $m^2$, preferably at least 1 $m^2$. The platform may comprise a plurality of hatches. When there is more than one platform present, any or all of the platforms may comprise at least one hatch. The hatch, when opened, may provide at least one platform edge.

The upper surface of the platform may comprise at least one attachment, preferably a plurality of attachments. These attachments may preferably surround the hatch.

The at least one platform may comprise at least one skid. The skid may be a skid such as that found on a helicopter's undercarriage. Such a skid may comprise a generally horizontal bar running parallel with the adjacent edge of the platform. The horizontal bar may be lower than the platform surface and may be spaced laterally outward from the platform edge. This mimics a helicopter's skid, and so can be used for practicing fast-roping from helicopters. The platform may comprise a plurality of skids. When more than one platform is present, any or all of the platforms may comprise at least one skid. The skid may be thought of as part of the platform, or as attached to the platform. When the rope hangs partially vertically from the attachment to contact the platform, it may contact the (horizontal bar of) the skid.

The at least one platform may comprises at least one jettied deck. The jettied deck may extend horizontally from the platform, preferably in a direction perpendicular to the side walls of the platform-supporting structure. The jettied deck may extend from the platform from between the platform-supporting structure and the outer edge of the platform. The jettied deck may comprise an outer edge distant from the platform. The outer edge may extend horizontally in a direction perpendicular to the end walls of the platform-supporting structure. The outer edge of the jettied deck may overhang only the ground surface, i.e. it has lateral clearance from the platform-supporting structure/platform to avoid overhanging any other components of the training apparatus. The jettied deck may extend laterally from the platform, and perpendicular to the plane of the first side wall of the platform-supporting structure, by at least 0.4 m, preferably 0.5 m. The jettied deck may be rectangular and may have a length of at least 1 m, but less than the width of the platform, and may have a width of at least 0.4 m, preferably at least 0.5 m. The upper surface of the jettied deck may be flush/continuous with the upper surface of the platform.

The skid may be attached to the outer edge of the jettied deck.

The at least one attachment may be provided on a frame. The frame may be supported at least partially by the platform. Additionally/alternatively, the frame may be supported by the surface, particularly with regard to the external wall platform. The frame may comprise at least one at least partially vertical member extending to a height above the platform, preferably above a user's head height. The frame may also comprise at least one at least partially horizontal member extending outward, preferably over the edge of the platform, preferably outward from the upper portion of the at least one at least partially vertical member. The frame may comprise at least one strut supporting the at least one at least partially horizontal member relative to the at least one at least partially vertical member. The attachment may be connected (directly or indirectly) to the outer portion of the at least one at least partially horizontal member.

Preferably, the frame comprises at least two at least partially vertical members and at least two respective at least partially horizontal members. These may be spaced relative to one another such that a bar may extend horizontally between the outer portions of the respective at least partially horizontal members. The bar may be substantially parallel to the adjacent edge of the platform. The attachment may be mounted to the bar. The bar may extend substantially the length of the adjacent platform edge. The two at least partially vertical (and the respective two at least partially horizontal) members may be located at opposite ends of the adjacent edge of the platform. By "adjacent edge" it is intend to mean the edge nearest to the attachment, over which the attachment is mounted.

However, it is not necessary to have a frame above the platform. For instance, when one platform is above another (e.g. the floor-level platform may be vertically below the upper-most level platform), the attachment for the lower platform may be provided on the upper platform. For instance, the attachment may be provided on the underside of the upper platform, or may be provided on the upper side of the upper platform and a passage for the rope (e.g. the hatch) may allow for the rope to hang down through the upper platform and past the lower platform.

The attachment may be a hoop, a ring, a swivel, a pulley or any other means suitable for hanging a fast-rope. There may be a plurality of attachments. There may be a plurality of attachments on the bar. There may be a plurality of attachments on each platform, and/or on each edge of the/each platform.

The training apparatus may comprise a gate configured to optionally block a user's pathway to the platform or to an edge of the platform. This gate may be part of a balustrade blocking a user's pathway to the platform or to an edge of the platform. The gate (and balustrade) acts to improve the safety of the users. The platform may comprise a plurality of gates. When there is more than one platform present, any or all of the platforms may comprise at least one gate.

The balustrade described in this disclosure may be a railing, bannister, fence, wall or any suitable barrier.

The training apparatus may comprise an anchor device for securing a user to the training apparatus in order to prevent the user falling from the platform. The anchor device may be located above the platform. The anchor device is preferably above head-height of the user. An anchor device that allows movement of the user around the platform is preferable. A rail provides such functionality. The user can be secured to the anchor via a carabiner, or any other suitable clip, and a rope, or any other suitable tether. The anchor device may preferably comprise a rail. The rail may extend across or along the platform, preferably in a linear direction, preferably across/along above a central portion of the platform (e.g. toward the centre, away from the outer edge(s) of the platform).

The training apparatus may comprise climbing equipment for accessing the at least one platform.

The climbing equipment may comprise a climbing wall. The climbing wall may be attached to an external wall, or may be formed on, an external wall of the platform-supporting structure. Preferably, the climbing wall extends from the bottom of the platform-supporting structure to the top of the platform-supporting structure. Preferably, the climbing wall extends substantially across the horizontal length of the platform-supporting structure. Preferably, the climbing wall is located adjacent/on the side wall of the platform-supporting structure (with respect to the length of the one or more containers), e.g. not the end wall. The climbing wall is preferably substantially vertical, but may be non-vertical. The climbing wall may be a façade that is attached to the external wall of the platform-supporting structure. Alternatively, the climbing wall may comprise (specifically designed climbing) holds attached to the external wall of the platform-supporting structure to allow users to climb up the platform-supporting structure.

Additionally/alternatively, the training apparatus may comprise a climbing wall that extends substantially across the horizontal width of the platform-supporting structure. Preferably, the climbing wall is located adjacent/on the end wall of the platform-supporting structure (with respect to the length of the one or more containers), e.g. not the side wall.

The climbing wall is preferably angled or non-vertical, but may also be vertical. The climbing wall may be a façade that is attached to the external wall of the platform-supporting structure. Alternatively, the climbing wall may comprise (specifically designed climbing) holds attached to the external wall of the platform-supporting structure to allow users to climb up the platform-supporting structure.

The training apparatus may also comprise an attachment for attaching safety ropes for the climbing wall, in order to prevent the user from falling from the climbing wall. The safety rope(s) may also be provided.

Combining a climbing wall with the training apparatus allows for improved training, as the mental and physical fitness of the users can be pushed in between practicing fast-roping. In the prior art, steps or stairs are used to allow the user to reach the platform. This does not have the same benefits as a climbing wall.

The term climbing wall is intended to cover a wall that includes modifications, such as purpose-built holds, that are specially positioned and configured to allow a user to climb up the wall.

Additionally/alternatively, the climbing equipment may comprise at least one ladder. The at least one ladder may extend from the surface to the stop of the platform-supporting structure.

The ladder may be external to the platform-supporting structure, and may be attached to an external wall of the platform-supporting structure (preferably the opposite side wall to the climbing wall). The ladder may pass by the external wall platform to allow access to the external wall platform (e.g. it may pass with 1 m, preferably 0.5 m, of the external wall platform). Preferably the ladder is attached to the same external wall as the external wall platform. Preferably the ladder comprises a cage for protecting the user, preferably the cage is only present at heights above the height of the external wall platform so as to allow the user to step off the ladder onto the external wall platform.

Alternatively, the at least one ladder may be internal to the platform-supporting structure. The ladder may extend directly from the bottom of the platform-supporting structure through the one or more containers to the top of the platform-supporting structure. Alternatively, the ladder may extend from the floor of a lower container to the floor of a higher container. There may be a plurality of such ladders, providing a path from the bottom to the top of the platform-supporting structure.

Additionally/alternatively, the climbing equipment may comprise a staircase external to the platform-supporting structure. The staircase may be a spiral staircase. The platform-supporting structure may comprise external doors. The doors and the staircase may be arranged such that the staircase provides access to the doors. Each of the one or more containers that make up wall where the staircase is adjacent to may comprise a door. Each door may provide access through the wall of a given container.

Additionally/alternatively, the climbing equipment may comprise steps or stairs. The steps or stairs may be internal to the platform-supporting structure. There may preferably be a flight of stairs extending from a floor of a lower container to a floor of a higher container, or from a floor of a (or the) container to a roof of the same container. There may be a plurality of such flights providing a path from the bottom of the platform-supporting structure to the top of the platform-supporting structure.

On the inside of the platform-supporting structure, the one or more containers may comprise openings in their walls, roofs and/or floors to allow users to move between the one or more containers of the platform-supporting structure as desired.

The platform-supporting structure may comprise an uppermost portion. The training apparatus may further comprise a top training apparatus assembly. The top training apparatus assembly may be arranged on the uppermost portion of the platform-supporting structure, and may comprise a first portion that at least partially overlaps with the platform-supporting structure and a second portion that overhangs the surface thus forming the at least one platform. This platform may be the uppermost-level platform.

When the platform-supporting structure is a stack, and the training apparatus is a tower, the top training apparatus assembly may be a top tower assembly.

The top training apparatus assembly may be a prefabricated module, or may be made of a plurality of prefabricated modules. This allows for the construction of the training apparatus to be simplified. The top training apparatus assembly may be secured to the platform-supporting structure. The prefabricated module(s) may have a length equal to or greater than the length of one of said one or more containers and a width substantially equal to the width of one of said one or more containers.

The first portion overlapping with the platform-supporting structure is overlapping when viewed from vertically above.

Other components of the training apparatus, such as the balustrade(s), the gate(s), the anchor(s), the attachment(s), the skid(s), the hatch(es), etc., can be provide as part of the top training apparatus assembly.

The top training apparatus assembly may comprise a floor portion, a first portion of which at least partially overlaps with the platform-supporting structure and a second portion of which overhangs the surface thus forming the at least one platform.

The top training apparatus assembly may have substantially the same width as the platform-supporting structure, but may be longer than the platform-supporting structure. The top training apparatus assembly may be arranged on the platform-supporting structure such that there is no overhang of the platform assembly over the side walls of the platform-supporting structure. The top training apparatus assembly may be arranged such that there is an overhang of the top training apparatus assembly over at least one of the end (and preferably both ends) of the platform-supporting structure.

The training apparatus may comprise a roof. The roof may be a cover or awning. The roof may substantially cover the platform-supporting structure. The roof may substantially cover the at least one platform. The roof may substantially cover all the platforms, except possibly the external wall platform. The roof may be attached to the top training apparatus assembly and may substantially cover the top training apparatus assembly, preferably the floor portion of the top training apparatus assembly. The roof is preferably above head-height in relation to the at least one platform, preferably in relation to the uppermost-level platform, preferably in relation to the floor of the top training apparatus assembly.

The training apparatus may comprise a frame. The roof may be supported by the frame.

The frame of the top training apparatus assembly may incorporate vertical and horizontal members, so as to preferably provide the overhanging attachment(s) for platforms and to provide support for the roof. The horizontal members may be above head height of a user standing on the top training apparatus assembly.

The one or more containers and the platform-supporting structure may be rectangular when viewed from above. The length of the one or more containers (e.g. the longest measurement of the rectangle) may define a side wall of the platform-supporting structure. The width of the one or more containers may define an end wall of the platform-supporting structure.

The platform may be rectangular when viewed from above.

When the platform is the uppermost level platform, the length of the platform (as used in this specification) may be in the direction perpendicular to the side walls of the platform-supporting structure. The width of the platform may in the direction perpendicular to the end walls of the platform-supporting structure. Whilst the length may be longer than the width of the platform, the width may also be longer than the length: here "length" and "width" may merely relative terms.

When the platform is the floor-level platform, the length the length of the platform (as used in this specification) may be in the direction perpendicular to the side walls of the platform-supporting structure. The width of the platform may in the direction perpendicular to the end walls of the platform-supporting structure. Whilst the length may be longer than the width of the platform, the width may also be longer than the length: here "length" and "width" may merely relative terms.

The jettied deck may be rectangular when viewed from above. The length of the jettied deck (as used in this specification) may be perpendicular to the end walls of the platform-supporting structure. The width of the jettied deck may be in the direction perpendicular to the side walls of the platform-supporting structure. Whilst the length may be longer than the width of the jettied deck, the width may also be longer than the length: here "length" and "width" may merely relative terms.

The platform-supporting structure may comprise (or consist of) single containers stacked on top of each other, or even just one single container. However, the platform-supporting structure may also comprise two or more containers arranged horizontally relative one another. These containers may form layers of the platform-supporting structure, with layers stacked on top of each other. The two or more containers arranged horizontally may be adjacent each other, preferably contacting each other and further preferably fixed to each other. This has the advantage of increasing the width of the platform-supporting structure, and hence increasing the stability of the platform-supporting structure. Since the area of the platform-supporting structure (when viewed from above) is increased, the size of the platform area(s) may also be increased.

The platform-supporting structure may have a length substantially equal to the length of a single container. The platform-supporting structure may have a width larger than (or equal to) the width of a single container. The length of the platform-supporting structure may be defined by the length of the one or more containers. The width of the platform-supporting structure may be defined by the width of one, two, three or more containers arranged in a layer.

Preferably, each layer comprises (only) two containers.

The containers of each layer may be attached to each other such that respective side walls of the containers are adjacent each other (such that they face each other) and such that respective end walls are in line with each other. The respective shipping containers of a given layer may be arranged horizontally with respect to each other. All the layers may have a similar way form. The layers may be stacked on top of each other such that the side walls and the end walls of the containers form vertical walls of the platform-supporting structure. This may form a platform-supporting structure that has a width substantially equal to the sum of the widths of the containers used in a given layer, and a length substantially equal to the length of an individual container.

The platform-supporting structure may also be thought of as a plurality (preferably two) columns of containers placed adjacent each other such that the side walls of the respective containers are adjacent each other and such that the end walls are aligned.

The platform-supporting structure is preferably made of (only) three layers of the shipping containers stacked vertically on top of one another. The containers may be stacked such that the floor of the containers of an upper layer container rests and may be attached to the roof of the containers of a lower layer. Respective lateral walls of the containers in a given column may be in the same general planes. End walls of the containers may be in the same general planes. In this way, the containers of a given column may be stacked in an aligned arrangement, such that their peripheral walls and ends are aligned with each other.

A first layer may be arranged on the ground surface (not shown). A second layer may be arranged on the first layer. A third layer may be arranged on the second layer.

The aligned lateral side walls of containers may form respective lateral side walls of the platform-supporting structure. The aligned ends of the containers may form respective end walls of the platform-supporting structure.

The training apparatus with such a platform-supporting structure may comprise any of the features of the training apparatus discussed herein. However, some of said features may be slightly different or modified when a larger platform-supporting structure is used.

For instance, floor-level platform and the uppermost-level platform may be larger, as it is accommodated by the larger platform-supporting structure. When n containers form a given layer, the platform may be n times longer/larger than the platform when the platform-supporting structure has a width equal to that of a single container.

In another aspect, the invention can provide a climbing training apparatus comprising a structure comprising one or more containers; and a climbing wall attached to, or formed on, an external side wall of the structure.

Preferably, the climbing wall extends from the bottom of the structure to the top of the structure. Preferably, the climbing wall extends substantially across the horizontal length of the structure. Preferably, the climbing wall is located adjacent to/on the side wall of the structure (with respect to the length of the containers), e.g. not the end wall. The climbing wall is preferably substantially vertical. The climbing wall may be a façade that is attached to the external wall of the structure. Alternatively, the climbing wall may comprise holds specially attached to the external wall of the structure to allow users to climb up the structure.

The climbing training apparatus may also comprise an attachment for attaching safety ropes for the climbing wall, in order to prevent the user from falling from the climbing wall.

Such a climbing training apparatus is advantageous as it is cheap and easy to manufacture and transport. This climbing training apparatus may comprise any of the features discussed above in relation to the other aspects of this invention. The structure may comprise any of the features discussed herein in relation to the platform-supporting structure. The structure may (or may not) be a platform-supporting structure.

The skilled person would immediately appreciate that any different combinations of the above-discussed features are possible.

BRIEF DESCRIPTION OF THE DRAWINGS

Certain preferred embodiments will now be described by way of example only and with reference to the accompanying drawings, in which.

DETAILED DESCRIPTION

Figure 1:
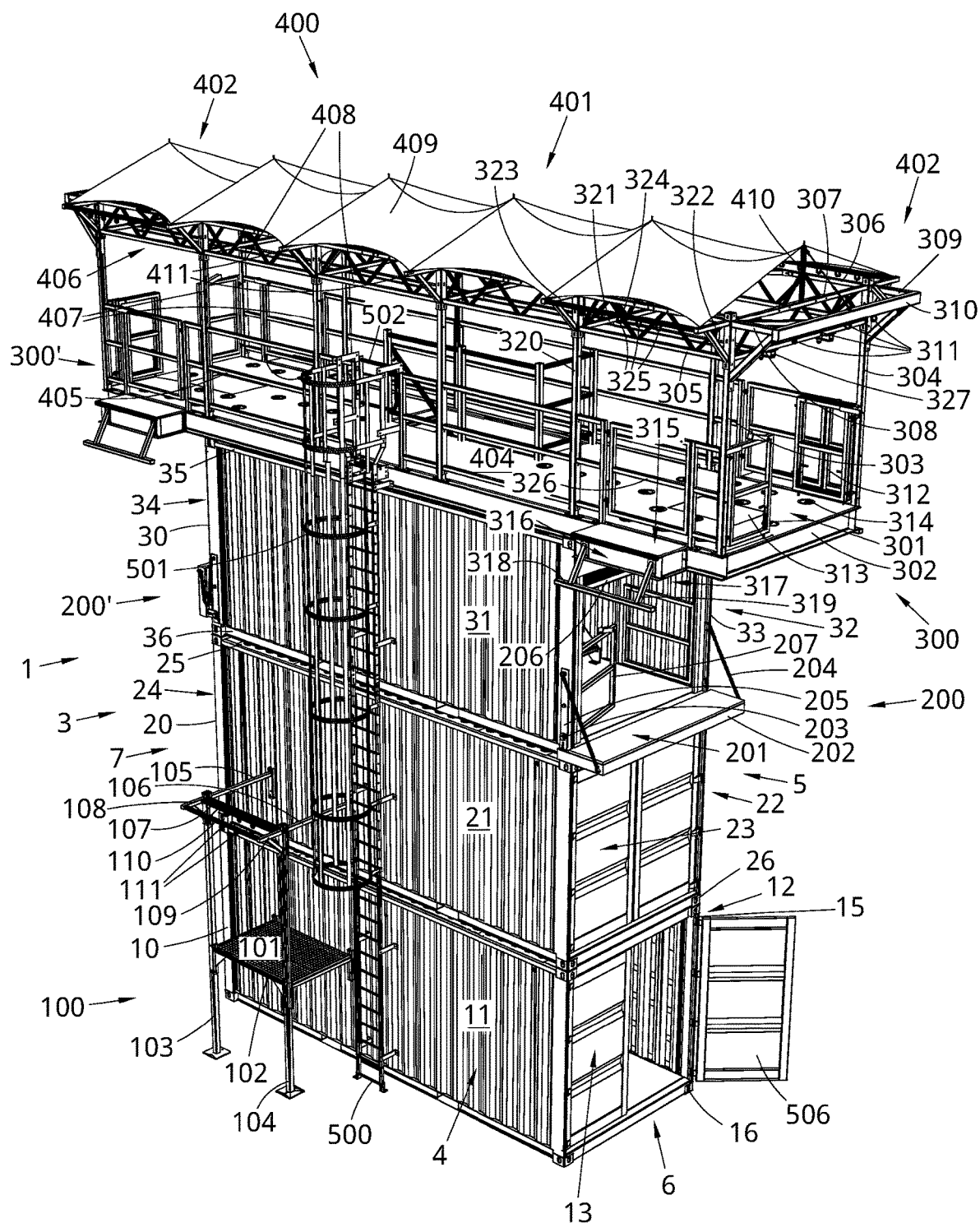
FIG. 1 shows a perspective view of a tower according to an embodiment of the present invention.

Shown in FIG. 1 is an embodiment of the apparatus 1 for fast-rope training. This apparatus is in the form of a tower 1. The tower 1 comprises a platform-supporting structure 3. The platform-supporting structure 3 takes the form of a stack 3 of ISO shipping containers 10, 20, 30 and a plurality of platform assemblies 100, 200, 300 configured for use in fast-rope training.

The containers 10, 20, 30 are cuboid-shaped. Each ISO shipping container 10, 20, 30 is of substantially the same dimensions, having a lateral length of around 20' (6.1 m), a lateral width of around 8' (2.4 m) and a vertical height of around 8' (2.4 m).

Each of the containers 10, 20, 30 comprises a first lateral external side wall 11, 21, 31 extending vertically along the length of the container 10, 20, 30; a second lateral external side wall 12, 22, 32 extending vertically along the length of the container 10, 20, 30 and parallel to the first lateral external side wall 11, 21, 31; a first end 13, 23, 33 extending vertically between and perpendicular to the first lateral external side wall 11, 21, 31 and the second lateral external side wall 12, 22, 32 at an end of the first lateral external side wall 11, 21, 31 and the second lateral external side wall 12, 22, 32; a second end 14, 24, 34 extending vertically between the first lateral external side wall 11, 21, 31 and the second lateral external side wall 12, 22, 32, perpendicularly to the first lateral external side wall 11, 21, 31 and the second lateral external side wall 12, 22, 32 at the other end of the first lateral external side wall 11, 21, 31 and the second lateral external side wall 12, 22, 32, and parallel to the first end 13, 23, 33; a roof 15, 25, 35 extending horizontally between an uppermost portion of the first lateral side wall 11, 21, 31, the second lateral side wall 12, 22, 32, the first end 13, 23, 33 and the second end 14, 24, 34; and a floor 16, 26, 36 extending horizontally between the lowermost portion of the first lateral side wall 11, 21, 31, the second lateral side wall 12, 22, 32, the first end 13, 23, 33 and the second end 14, 24, 34 parallel to the roof 15, 25, 35.

The stack 3 is made of three ISO shipping containers 10, 20, 30 stacked vertically on top of one another. The containers are stacked such that the floor 26, 36 of an upper container 20, 30 rests and may be attached to the roof 15, 25 of a lower container 10, 20; and such that the first lateral walls 11, 21, 31 are all in the same general plane; and such that the second lateral walls 12, 22, 32 are all in the same general plane; and such that the first ends 13, 23, 33 are all in the same general plane; and such that the second ends 14, 24, 34 are all in the same general plane. In this way, the containers 10, 20, 30 are stacked in an aligned arrangement, such that their peripheral walls and ends are aligned with each other.

A first container 10 is arranged on the ground surface (not shown). A second container 20 is arranged on the first container. A third container 30 is arranged on the second container.

The aligned first lateral side walls 11, 21, 31 thus generally form a first lateral side wall 4 of the stack 3. The aligned second lateral side walls 12, 22, 32 thus generally form a second lateral side wall 5 of the stack 3. The aligned first ends 13, 23, 33 thus generally form a first end 6 of the stack. The aligned second ends 14, 24, 34 thus generally form a second end 7 of the stack.

The stack 3 rests on a preferably flat and horizontal ground surface (not shown).

The tower 1 comprises a first platform assembly 100. The first platform assembly 100 is an external wall 4 platform assembly. The first platform assembly 100 comprises a first platform 101 that is attached to the external side wall 11 of the first container 10. The first platform 101 is an external wall platform. The first platform 101 extends horizontally outward from the external side wall 11. The first platform 101 overhangs the ground surface. The first platform 101 is general rectangular and has horizontal dimensions of around 1-2 m by 1-2 m, preferably around 1 m by 1.5 m. The first platform 101 is between 1-2 m above the ground surface. The first platform 101 comprises an outer edge 102 that is horizontal and runs parallel to the external wall 4. The outer edge 102 is the laterally outermost edge of the platform 101 when viewed from above.

At opposite ends of its outer edge 102, the first platform 101 is supported by and attached to two vertical members 103, 104. The first platform 101 is directly attached to the two vertical members 103, 104 and respective struts may be connected between the first platform 101 and the vertical members 103, 104 for additional support. The vertical members 103, 104 are 1-2 m, preferably around 1 m, away from the external wall 4 of the stack 3. The vertical members 103, 104 extend vertically from the ground surface to a height of around 2-5 m, preferably around 3.5 m, above the ground and preferably at least around 2 m above the first platform 101 (e.g. above head height of someone on the platform 101). The bottoms of each of the vertical members 103, 104 contact the ground via ground engaging plates. The tops of each of the vertical members 103, 104 are attached to respective horizontal members 105, 106 that extend perpendicular to the external wall 4 of the stack and attach to the first lateral side wall 21 of the second container 20. The tops of each of the vertical members 103, 104 are connected together by a horizontal member 107 that extends parallel to the lateral external side 4 of the stack 3 and parallel to the outer edge 102 of the platform 101. The horizontal member 107 has generally the same length as the length of the outer edge 102 and is substantially directly vertically above the outer edge 102.

Extending horizontally and laterally (perpendicular to the side wall 4 of the stack 3) outward from the tops of each of the vertical members 103, 104 are respective horizontal members 108, 109. These may each extend less than 1 m, preferably less than 0.5 m, laterally of the platform edge 102. Laterally outward ends the horizontal members 108, 109 are connected to the respective vertical members 103, 104 via respective off-vertical struts to provide support to the horizontal members 108, 109. The horizontal members 108, 109 are connected by a horizontal beam 110 that extends parallel to the lateral external wall 4 of the stack 3. The height of the beam 110 is substantially the same as the height of the vertical members 103, 104. The height of the beam 110 is around 2-5 m, preferably around 3.5 m, above the ground and preferably at least around 2 m above the first platform 101 (e.g. above head height of someone on the platform 101). The beam 110 is located at the laterally outward peripheral ends of the horizontal members 108, 109. The beam 110 is less than 1 m, preferably less than 0.5 m, laterally of the platform edge 102. The beam 110 has generally the same length as the length of the outer edge 102 of the first platform 101 and is parallel to the outer edge 102.

On the beam 110 is provided a plurality of attachment rings 111 for attaching a fast rope. The attachments 111 are spaced substantially equally along the beam, by at least 0.2 m, preferably 0.3 m, preferably 0.4 m, preferably 0.5 m.

In the way described above, when ropes are attached to respective attachments 111 on the beam 110, they may hang vertically from a height above the user's head height and toward the ground surface and may pass the outer edge 102 of the platform 101 within a user's arm's reach. Further, as can be seen from the above description, the attachment 111 is supported by a frame 103, 104, 105, 106, 107, 108, 109, 110.

The tower 1 comprises a second platform assembly 200. The second platform assembly 200 is a floor-level platform assembly. The second platform assembly comprises a second platform 201. The second platform 201 is a floor-level platform. The second platform 201 overhangs the ground surface. The second platform 201 is located at an end 6 of the stack 3. The second platform 201 extends across substantially the entirety of the width of the stack 3, i.e. from the first side 4 to the second side 5. The second platform 201 is rectangular in shape and has an outer peripheral edge 202 (when in the deployed position) that extends across substantially the entirety of the width of the stack 3 and is spaced from the first end 6 of the stack 3. The second platform 201 has a length approximately equal to the width of the stack 3, e.g. around 8' (2.4 m). The second platform 201 as a width (i.e. the distance that the outer edge 202 extends beyond the end 6 of the stack when view from above) of less than 1 m, preferably less than or equal to 0.5 m. Thus, when in the deployed position the peripheral edge 202 is preferably less than 1 m, preferably less than or equal to 0.5 m, from the end 6 of the stack 3. This is preferable so that users using the second platform assembly 200 do not interfere with or interrupt using the third platform assembly 300 (see below). The upper surface of the second platform 201 is flush with the upper surface of the floor 36 of the container, when in the deployed position. There is a minimal gap (preferably no gap) between the floor 36 and the platform 201, i.e. the upper surface of the second platform 201 and the floor 36 are substantially continuous.

The second platform 201 is attached to a lower portion (e.g. floor 36 or lower portion of first end 33) of the third container 30 via hinges 203. The hinges 203 allow for the second platform 201 to pivot about a horizontal axis parallel to the length of the second platform 201 and perpendicular to the plane of the side walls 4, 5 of the stack 3. The axis of rotation defined by the hinges 203 may be located proximate the corner of the stack 3 where the first end 33 meets the floor 36 of the container 30.

The second platform 201 may therefore pivot between a vertical retracted position and a horizontal deployed position. Here vertical and horizontal refer to the orientation of the upper surface of the second platform 201. When in the retracted position, the plane defined by the platform 201 is parallel to the first end 6 of the stack 3, and the platform 201 is adjacent to and the upper surface (when in use) of the platform 201 may contact the first end 6 of the stack 3. The platform 201 generally rotates upwards toward the retracted position. When in the deployed position, the plane defined by the platform 201 is horizontal. The platform 201 generally rotates downwards toward the deployed position.

The second platform assembly 200 comprises second platform support struts 204 that support the second platform 201 relative to the stack 3, when in the deployed position. The support struts 204 may themselves be hinged and may also be foldable in a central portion of the support struts 204 to allow for the platform 201 to pivot between its retracted and deployed positions. Each support strut 204 is connected between respective ends of the platform 201 and respective locations on the stack 3, preferably to a location higher than the platform 201 when the platform is in the deployed position. The struts 204 connect to the platform 201 proximate the outer edge 202.

The platform 201 is attached to the container 30 by brackets 205. Each bracket 205 is attached to a respective external side wall 31, 32 of the container 30 proximate the end 33 of the container 30. Each bracket 205 may comprise respective hinges 203. Each strut 204 may connect to respective brackets 205. Each bracket 205 extends substantially vertically, the hinge 203 being toward the bottom of the bracket 205 and the strut 204 being connected toward the top of the bracket 205.

The first end 33 of the container 30 comprises a door 206 for accessing the second platform 201 and for closing off the first end 33 when the platform 201 is retracted or not in use, e.g. for transport. The door 206 may be a roller shutter door. The door 206 is configured so that when it is opened substantially the entirety (or at least a majority) of the first end 33 of the container 30 is open.

The first end 33 of the container 30 comprises a gate 207 for accessing the second platform 201 and for preventing access to the second platform 201. The gate 207 is hinged to the inside of the external side walls 31, 32 of the container 30. The gate 207 is configured so that when it is opened access is provided to the platform 201 across substantially the entirety (or at least a majority) of the width of first end 33.

Figure 2:
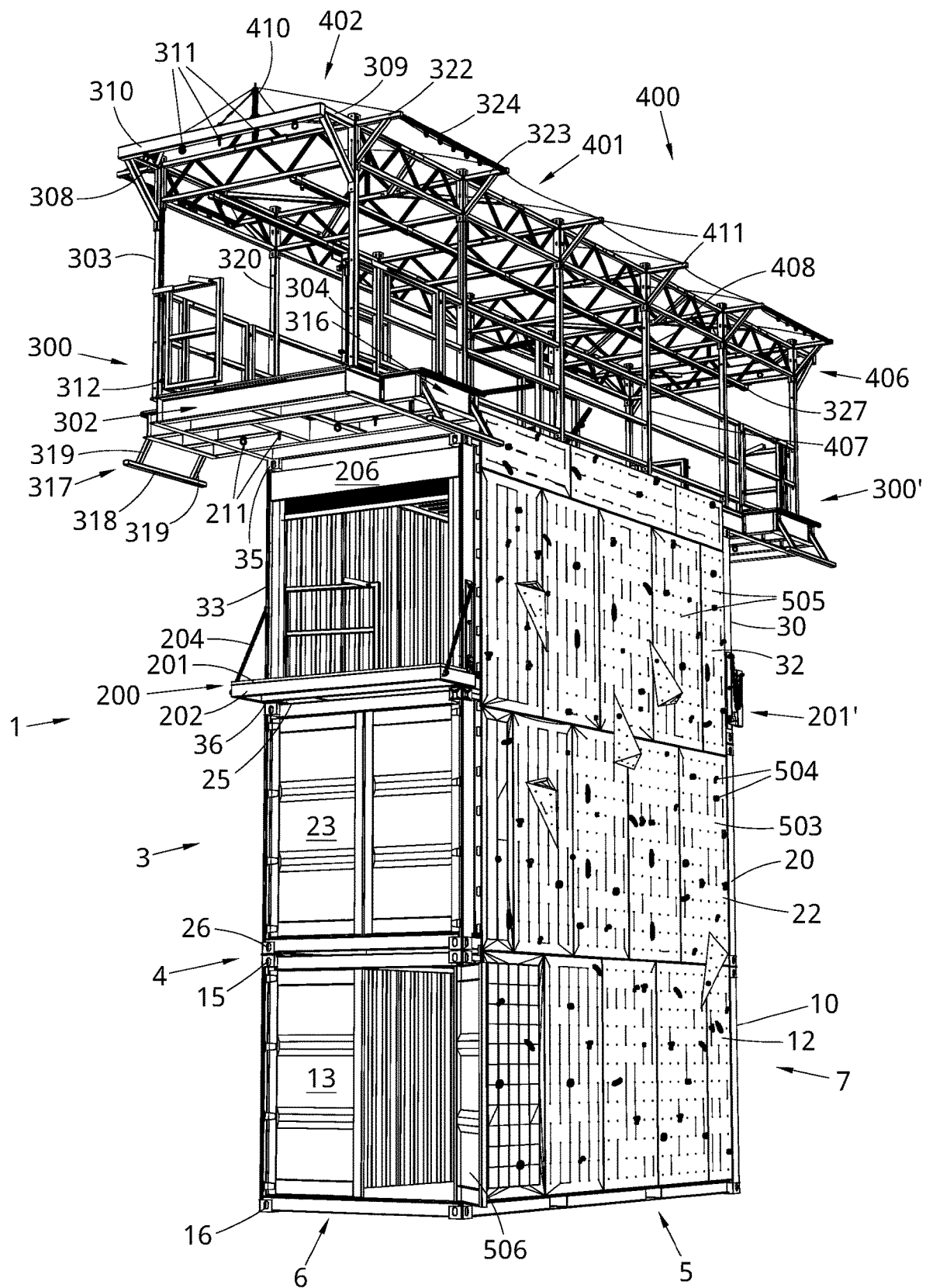
FIG. 2 shows another perspective view of the tower of FIG. 1.
Figure 3:
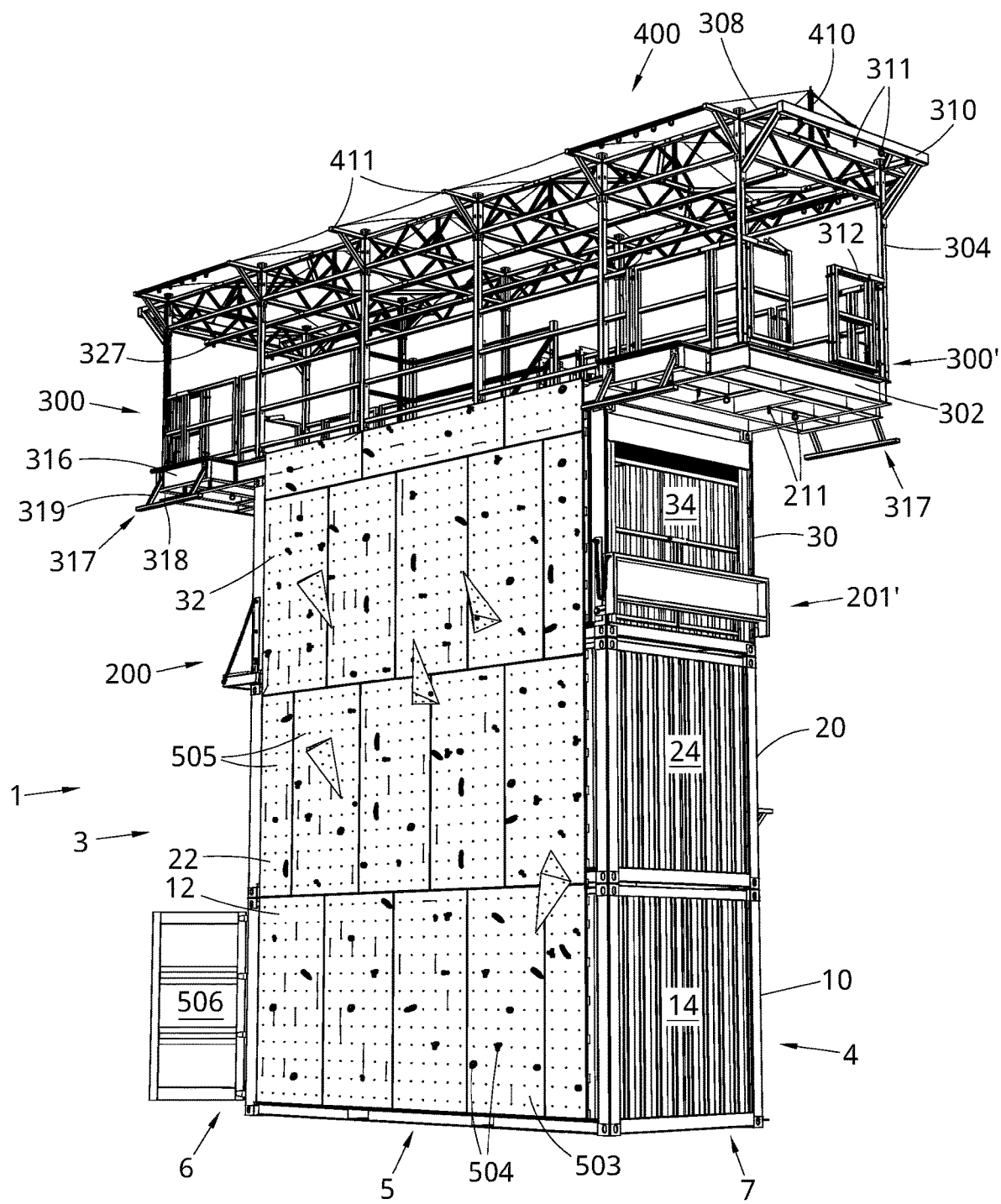
FIG. 3 shows another perspective view of the tower of FIG. 1.
Figure 4:
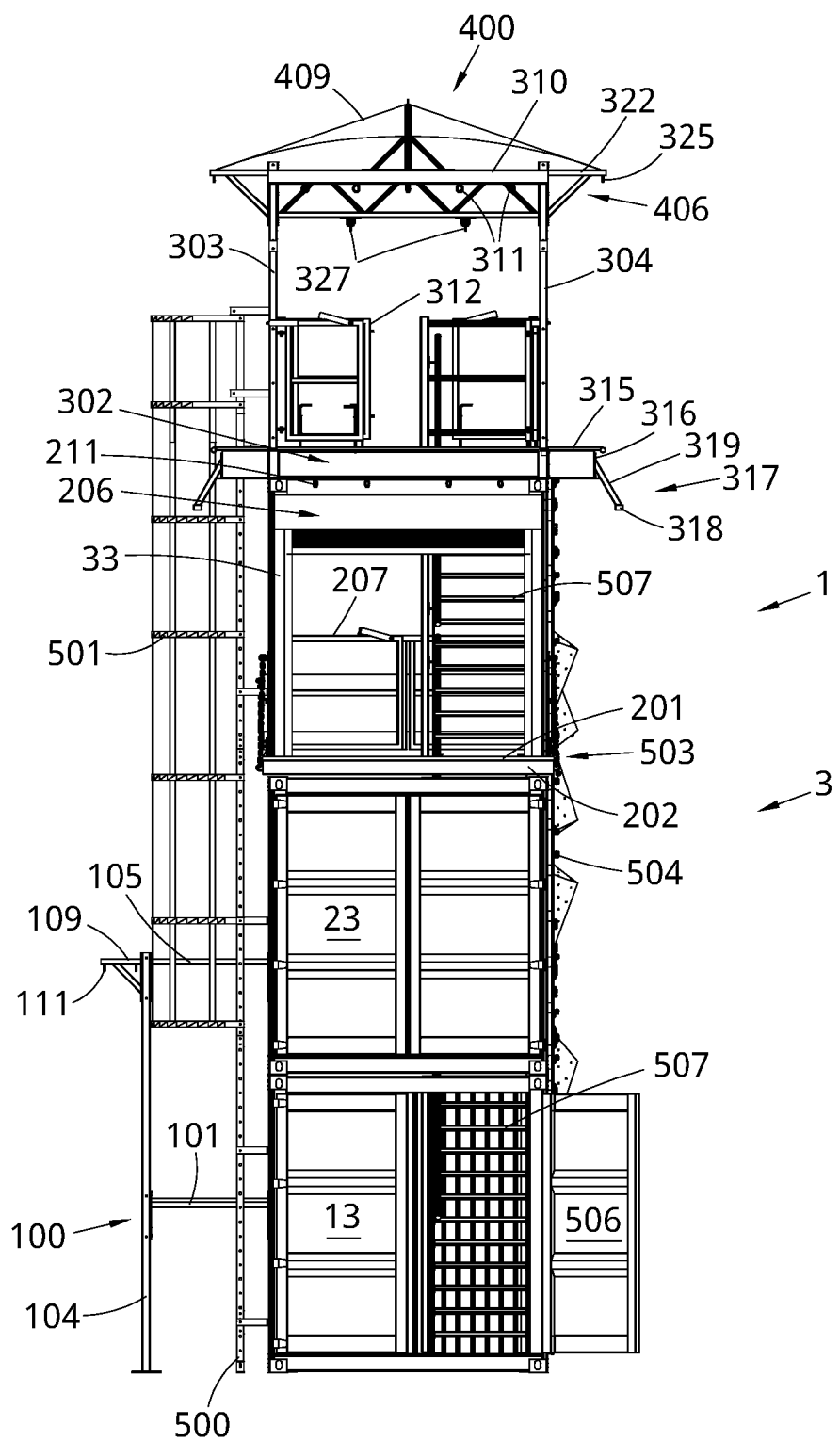
FIG. 4 shows an end-on view of the tower of FIG. 1.
Figure 5:
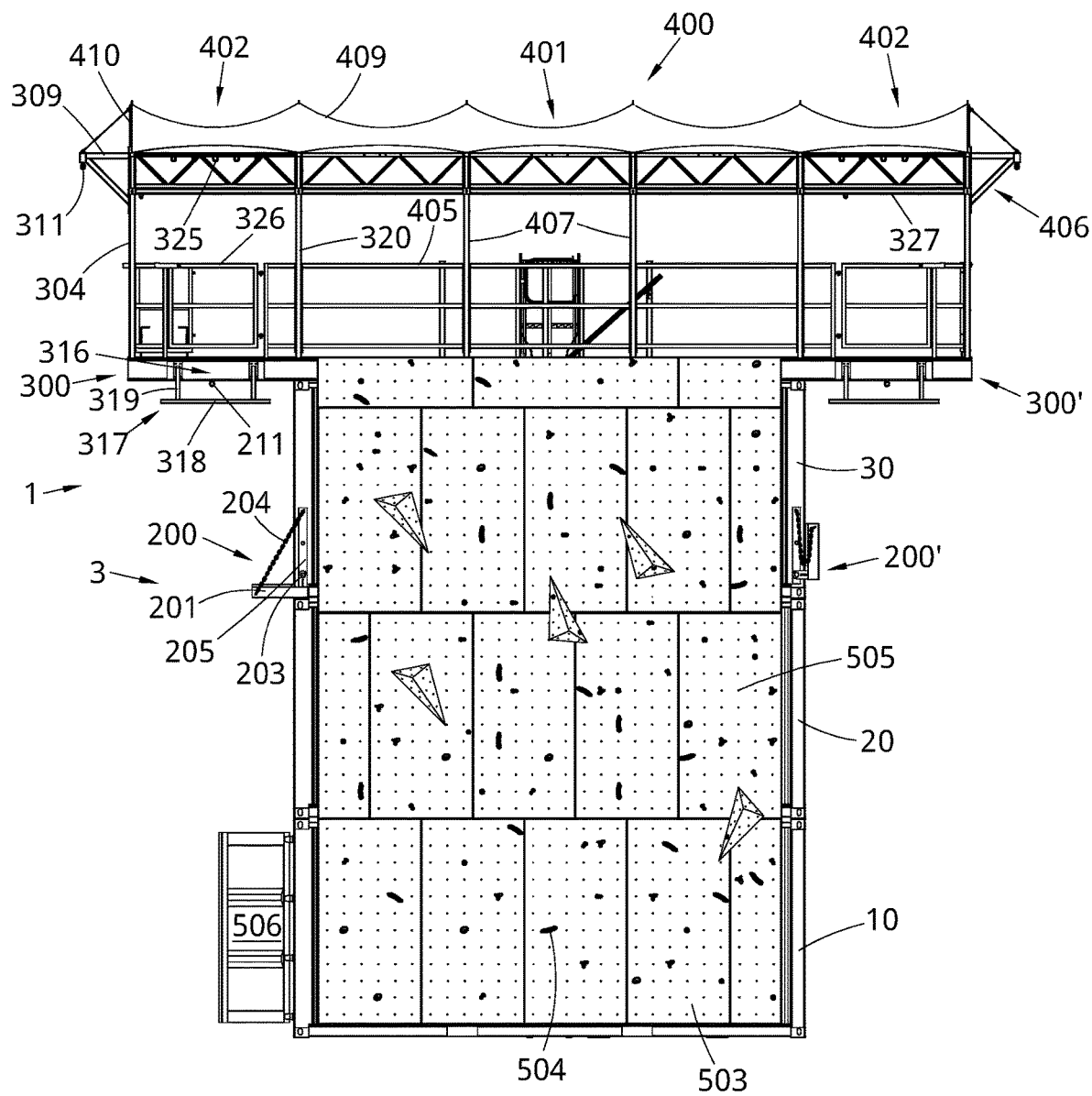
FIG. 5 shows a side-on view of the tower of FIG. 1.
Figure 6:
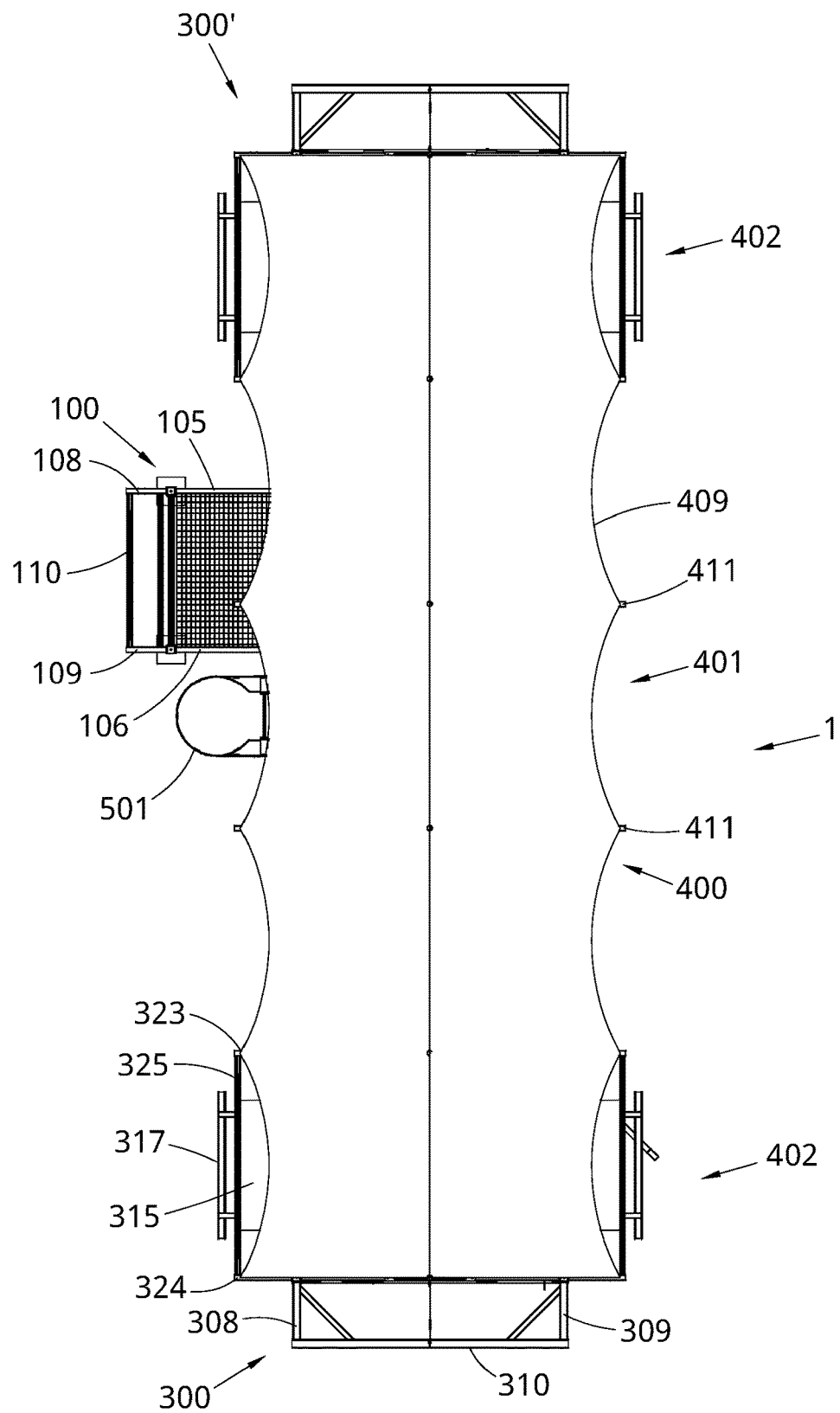
FIG. 6 shows a plan view of the tower of FIG. 1.

The second platform assembly 200 comprises attachments 211 for attaching a fast rope to, such as rings, hooks, etc. As can be seen in FIG. 2, these attachments 211 are attached to and supported by an underside of the third platform 301 (see below). The third platform 301 overhangs both the ground surface and the second platform 201. The third platform 301 extends outward from the end 6 of the stack 3 beyond the second platform 201. This allows the attachments 211 to be attached to the underside of the third platform 301 at locations such that when ropes are attached to respective attachments 211, they may hang vertically from a height above the user's head height and toward the ground surface and may past the outer edge 202 of the platform 201 within a user's arm's reach. Preferably, the attachments 211 are located within 1 m, preferably less than or equal to 0.5 m, from the outer edge 202 of the platform 201 (when viewed from above).

The attachments 211 are spaced (substantially equally) in a linear fashion on the underside of the third platform 301. This line is parallel with the outer edge 202 of the second platform 201. The attachments may be spaced by at least 0.2 m, preferably 0.3 m, preferably 0.4 m, preferably 0.5 m.

As can be seen from the above description, the attachment 211 is supported by a platform 301 above the second platform 201.

Although shown in the first end of 33 of container 30, the second platform assembly 200 could be located in the second end 34 of container 30, the first end 23 of container 20 or the second end 24 of container 20. It could be located in either end of any container that is not resting on the ground surface.

There is another second platform assembly 200' that is substantially identical to second platform assembly 200 (i.e. comprising all the features discussed above), but it is located at the other end 34 of the container 30. In FIG. 1 this second platform assembly 200' is shown in the retracted position.

It should be understood that the second platform assembly/assemblies 200, 200' may additionally/alternatively be located in the second container 20, or indeed any container that is not resting on the ground surface. There may be (only) one second platform assembly 200, 200' per end 6, 7 of the stack 3. There may (only) be a second platform assembly 200, 200' located at the first end 23 of the second container 20 and a second platform assembly 200, 200' located at the second end 24 of the second container 20. There may (only) be a second platform assembly 200, 200' located at the first end 23 of the second container 20 and a second platform assembly 200, 200' located at the second end 34 of the third container 30. There may (only) be a second platform assembly 200, 200' located at the first end 33 of the third container 20 and a second platform assembly 200, 200' located at the second end 24 of the second container 20. There may (only) be a second platform assembly 200, 200' located at the first end 33 of the third container 20 and a second platform assembly 200, 200' located at the second end 34 of the third container 20.

The tower 1 comprises a third platform assembly 300. The third platform assembly 300 is an uppermost-level platform assembly. The third platform assembly 300 comprises a third platform 301. The third platform 301 is an uppermost-level platform.

The third platform 301 is at substantially the same height as the uppermost portion of the stack 3, e.g. the roof 35 of the third/top container 30. The third platform 301 extends laterally outward from the stack.

The third platform 301 overhangs the ground surface, and the second platform 201. The third platform 301 is located at an end 6 of the stack 3. The third platform 301 extends across substantially the entirety of the width of the stack 3, i.e. from the first side 4 to the second side 5. The third platform 301 is generally rectangular in shape and has an outer peripheral edge 302 that extends across substantially the entirety of the width of the stack 3 and is spaced from the first end 6 of the stack 3. The third platform 301 has a length (i.e. the dimension of the third platform 301 in the direction perpendicular to the side walls 4, 5 of the stack, which is perpendicular to the length dimension of the containers 10, 20, 30) such that the outer edge 302 extends beyond the end 6 of the stack when view from above approximately equal to the width of the stack 3, e.g. around 8' (2.4 m), The third platform 301 as a width (i.e. the distance that the outer edge 302 extends beyond the end 6 of the stack when view from above) of less than 3 m, preferably less than or approximately equal to 2 m, preferably greater than 1 m, preferably greater than 1.5 m. Thus, in the peripheral edge 302 is preferably less than 3 m, preferably less than or approximately equal to 2 m, preferably greater than 1 m, preferably greater than 1.5 m, from the end 6 of the stack 3, The outer peripheral edge 302 of platform 301 extends beyond the outer peripheral edge 202 of platform 202, preferably by at least 1 m, 1.5 m, or 2 m. This is preferable so that users using the second platform assembly 200 do not interfere with or interrupt using the third platform assembly 300.

At opposite ends of its outer edge 302, two vertical members 303, 304 extend upward from the third platform 301. The vertical members 303, 304 extend vertically from the platform 301 to a height of between 2-3 m, preferably at least around 2 m above the platform 301 (e.g. above head height of someone on the platform 301). The tops of each of the vertical members 303, 304 are attached to respective horizontal members 305, 306 that extend perpendicular to the end wall 6 of the stack 3 and form part of an overhead framework 406 of the top tower assembly 400. The tops of each of the vertical members 303, 304 are connected together by a horizontal member 307 that extends parallel to the lateral end wall 6 of the stack 3 and parallel to the outer edge 302 of the platform 301. The horizontal member 307 has generally the same length as the length of the outer edge 302 and is substantially directly vertically above the outer edge 302.

Extending horizontally and laterally (perpendicular to the end wall 6 of the stack 3) outward from the tops of each of the vertical members 303, 304 are respective horizontal members 308, 309. These may each extend less than 1 m, preferably less than 0.5 m, laterally of the platform edge 302. Laterally outward ends the horizontal members 308, 309 are connected to the respective vertical members 303, 304 via respective off-vertical struts to provide support to the horizontal members 308, 309. The horizontal members 308, 309 are connected by a horizontal beam 310 that extends parallel to the end wall 6 of the stack 3. The height of the beam 310 is substantially the same as the height of the vertical members 303, 304. The height of the beam 310 is between 2-3 m, preferably at least around 2 m above the platform 301 (e.g. above head height of someone on the platform 301). The beam 310 is located at the laterally outward peripheral ends of the horizontal members 308, 309. The beam 310 is less than 1 m, preferably less than 0.5 m, laterally of the platform edge 102. The beam 310 has generally the same length as the length of the outer edge 302 of the third platform 301 and is parallel to the outer edge 302.

On the beam 310 is provided a plurality of attachment rings 311 for attaching a fast rope. The attachments 311 are spaced substantially equally along the beam, by at least 0.2 m, preferably 0.3 m, preferably 0.4 m, preferably 0.5 m.

In the way described above, when ropes are attached to respective attachments 311 on the beam 310, they may hang vertically from a height above the user's head height and toward the ground surface and may pass the outer edge 302 of the platform 301 within a user's arm's reach. Further, as can be seen from the above description, the attachment 311 is supported by a frame 303, 304, 305, 306, 307, 308, 309, 310.

The platform assembly 300 comprises a gate 312 for preventing and allowing access to the platform edge 302. The gate 312 is located proximate, preferably immediately next to, the edge 302. The gate 312, when closed, extends parallel to and along the edge 302. The gate 312 is (hingedly) attached to and supported by the vertical members 303, 304 located at either end of the outer edge. The gate 312 is configured so that when it is opened access is provided to the edge 302 across substantially the entirety (or at least a majority) of the width of the edge 302, and/or to only a (central) portion of the edge 302. This may be achieved by having a three-fold gate as shown in FIG. 1.

The third platform also comprises a hatch 313. The hatch 313 may be attached to the remainder of the platform 301 via a hinge or hinges. The hatch 313 is located in toward the centre of the platform 301. The hatch 313 allows rope to pass through the platform 301, and allows the user to fast-rope through the platform. The hatch 313 has an area of at least 0.5 m², preferably at least 1 m². The hatch 313 is rectangular and has dimensions of around 0.5 m by 1 m, for example 0.6 m by 0.9 m. The hatch 313 overhangs the ground surface but does not overhang the second platform 201—it is further laterally from the stack 3 than the outer edge 202 of the second platform 201.

The upper surface of the platform 301 comprises a plurality of attachments 314. These attachments 314 are recessed in the surface so they do not protrude above the general plane of the surface of the platform 301. The attachments 314 may be recessed swivel tie down rings. The attachments 314 are arranged around the hatch 313. There may be at least 5, 10 or 15 attachments 314.

The third platform assembly 300 further comprises a first jettied deck 315. The first jettied deck 315 extends horizontally from the platform 301 in a direction perpendicular to the side walls 4, 5 of the stack 3 and parallel to the outer edge 302. The jettied deck 315 extends from the platform 301 from between the stack 3 and the outer edge 302 of the platform. The first jettied deck 315 comprises an outer edge 316 distant from the platform 301. The outer edge 316 extends horizontally in a direction perpendicular to the end walls 6, 7 of the stack 3. In this way, the outer edge 316 of the jettied deck 315 overhangs only the ground surface, i.e. it has lateral clearance to avoid overhanging the second platform 201. The jettied deck 315 extends laterally from the platform 301, and perpendicular to the plane of the first side wall 4 of the stack 3, by at least 0.4 m, preferably 0.5 m. The jettied deck 315 is rectangular and may have a length of at least 1 m, but less than the width of the platform 301, and may have a width of at least 0.4 m, preferably at least 0.5 m. The midpoint of the length of the jettied deck 315 may be approximately aligned with the midpoint of the width of the platform 301. The midpoint of the length of the jettied deck 315 is around 1 m from the general plane of the first end 6 of the stack 3. The upper surface of the jettied deck 315 is flush/continuous with the upper surface of the platform 301.

Attached to the outer edge 316 of the jettied deck 315 is a skid 317. The skid 317 comprises a horizontal bar 318 running parallel with the adjacent edge 316 of the jettied deck 315. The horizontal bar 318 is connected to the outer edge 316 by two parallel connecting members 319. The connecting members 319 connect between the bar 318 and the outer edge 316, preferably opposite ends of the outer edge 316. The connecting members 319 are angled downward (at around 30-60° from the vertical) from the outer edge 316 such that the horizontal bar 318 is spaced laterally outward of the edge 316 and vertically downward from the edge 316. Preferably the bar 318 extends parallel to the edge 316 along the entire length of the edge 316, and is longer than the edge 316. The horizontal bar 318 may be around 1-2 m long and maybe spaced 0.1-0.5 m laterally from the edge and may be spaced 0.3-1 m vertically from the upper surface of the jettied deck 315. In this way, the horizontal bar 318 is positioned so a user can step down from the jettied deck 315 to the bar 318 safely and in a manner that mimics a helicopter's skid.

Beyond opposite ends of the outer edge 316 two vertical members 303, 320 extend upward from the third platform 301. One vertical member 303 extends from laterally outward of the jettied deck 315 and one vertical member 320 extends from laterally inward of the jettied deck 315, with respect to the general plane of the first end 6 of the stack 3. The vertical members 303, 320 extend vertically from the platform 301 to a height of between 2-3 m, preferably at least around 2 m above the platform 301 (e.g. above head height of someone on the platform 301). The tops of each of the vertical members 303, 320 are attached to respective horizontal members 307, 321 that extend parallel to the end wall 6 of the stack 3 and form part of an overhead framework 406 of the top tower assembly 400.

The tops of each of the vertical members 303, 320 are connected together by a horizontal member 305 that extends perpendicular to the lateral end wall 6 of the stack 3 and parallel to the outer edge 316 of the jettied deck 315. The horizontal member 305 has generally the same length as the width of the platform 301 (i.e. the distance the platform 301 overhangs the surface).

Extending horizontally and laterally (parallel to the end wall 6 of the stack 3) outward from the tops of each of the vertical members 303, 304 are respective horizontal members 322, 323. These may each extend less than 1 m, preferably less than 0.5 m, laterally of the platform 301. Preferably these extend the same distance from the platform as the jettied deck 315 does. Laterally outward ends the horizontal members 322, 323 are connected to the respective vertical members 103, 320 via respective off-vertical struts to provide support to the horizontal members 322, 323. The horizontal members 322, 323 are connected by a horizontal beam 324 that extends perpendicular to the end wall 6 of the stack 3. The height of the beam 324 is substantially the same as the height of the vertical members 303, 320. The height of the beam 324 is between 2-3 m, preferably at least around 2 m above the platform 301 (e.g. above head height of someone on the platform 301). The beam 324 is located at the laterally outward peripheral ends of the horizontal members 322, 323. The beam 324 is directly vertically above the edge 316 of the jettied deck 315, so that the horizontal bar 318 of the skid 317 extends laterally beyond the beam 324. The beam 310 has generally the same length as the width of the third platform 301 and is parallel to the outer edge 316.

On the beam 324 is provided a plurality of attachment rings 325 for attaching a fast rope. The attachments 325 are spaced substantially equally along the beam, by at least 0.2 m, preferably 0.3 m, preferably 0.4 m, preferably 0.5 m.

In the way described above, when ropes are attached to respective attachments 325 on the beam 324, they may hang from a height above the user's head height in an off-vertical manner to the horizontal bar 318. The ropes contact the bar 318 and then hang vertically downward toward the surface. This may mimic the situation in a helicopter. Alternatively, the beam 324 could be laterally spaced beyond the skid 317 so that a rope could hang vertically from the beam 324 past the skid 317 and on toward the ground.

As can be seen from the above description, the attachment 325 is supported by a frame 303, 320, 321, 306, 322, 323, 324.

The platform assembly 300 comprises a (second) gate 326 for preventing and allowing access to the jettied deck 315. The gate 326 is located proximate, preferably immediately next to, the jettied deck 315. The gate 326, when closed, extends parallel to the edge 316. The gate 326 is attached to and supported by the vertical members 303, 320 via fixed balustrade portions. The gate 326 is hinged to said balustrade. The gate 326 is configured so that when it is opened access is provided to the jettied deck 315 across substantially the entirety (or at least a majority) of the length of the jettied deck 315.

The jettied deck 315, skid 317 and/or frame discussed above may be located on the side of the platform 301 nearest the first external side wall 4 of the stack 3 (the first side of the platform 301), and/or may be located on the side of the platform 301 nearest the second external side wall 5 of the stack 3 (the second side of the platform 301). Two such jettied decks 315, skids 317 and frames etc. (as described above) may be provided by the platform assembly 300.

The platform assembly 300 may comprise two rails 327 running across the width of the platform 301. The rails 327 are at least 1.5 m, 1.75 m, 2 m above the platform 301, such that they are above head height of a user standing on the platform 301. The rails 327 are parallel with each other and are perpendicular to the general plane of the end 6 of the stack 3. The rails 327 are horizontal. The rails 327 are attached to horizontal members 307, 321 and run perpendicular to horizontal members 307, 321.

The rails 327 are configured such that a user can anchor themselves to one or both of the rails, as a safety means. The point at which the user is anchored to the rails 327 may move/slide along the rail 327. Two rails 327 are preferable as it allows multiple users to use the multiple edges 302, 316 for fast-roping simultaneously.

The tower 1 may comprise another third platform assembly 300' comprising some or all of the features discussed above in relation to the third platform assembly 300. This third platform assembly 300' may be at the opposite end 7 of the stack 3 compared to the end 6 at which the third platform assembly 300 is.

The tower 1 further comprises a top training apparatus assembly 400. The top training apparatus assembly 400 is a top tower assembly 400. The top tower assembly 400 is arranged on the uppermost portion of the stack 3, i.e. the roof 35 of the third container 30. The top tower assembly 400 comprises a first portion 401 that overlaps with the stack 3, a second portion 402 that overhangs the surface thus forming the third platform assembly/assemblies 300, 300'.

The top tower assembly 400 comprises a floor portion 404, a first portion of which at least partially overlaps with the stack 3 and a second portion of which overhangs the surface thus forming the at least one platform 301. The floor portion 404 has a width substantially identical to the width of the stack 3, e.g. around 8' (2.4 m). The length of the floor portion 404 is longer than the length of the stack 3, thus allowing the second portion 402 to overhang the ground surface. The second portion of the floor portion 404 is the platform(s) 301 (and the jettied deck(s) 315). Thus the upper surface of the platform(s) 301 are flush and continuous with the floor of the remainder of the floor portion 404.

The top tower assembly 400 comprises a balustrade 405 around its periphery.

The top tower assembly 400 comprises a frame 406. The frame 406 is constructed of vertical members 407 extending from the periphery of the floor portion 404 at evenly spaced intervals. The vertical members 407 are connected together by horizontal members 408, some of which extend across the width of the stack 3 and some of which extend in a direction parallel to the length of the stack 3. The vertical members 407 and the horizontal members 408 are arranged such that the horizontal members are at least 1.5, 1.75 or 2 m above the floor portion 404. This allows the horizontal parts of the frame 406 to be above head height.

The third platform assembly/assemblies 300, 300' is/are an integral part of the top tower assembly 400. The third platform(s) 301, and the jettied deck(s) 315, are integral parts of the floor portion 404 of the top tower assembly 400. The vertical members 407 comprise vertical members 303, 304 320. Horizontal members 408 comprise horizontal members 305, 306, 307, 321. Further, the rails 327 are part of the top tower assembly 400, and extend along substantially the entire length of the top tower assembly 400 (e.g. from one platform assembly 300 to the other 300').

As an aside, as shown in the Figures, the horizontal members 408, 305, 306, 307, 321 may have a construction comprising two (vertically) spaced horizontal beams connected by angled truss members. This provides a strong horizontal member. This collection of beams and trusses are referred to as a "horizontal member" as they rigidly joined and generally extend horizontally.

The top tower assembly 400 is a pre-fabricated module, which is placed on top of and attached to the stack 3 of containers 10, 20, 30.

The tower 1 comprises a roof 409. The roof 409 is a cover. The roof 409 substantially covers the remainder of the tower 1. The roof 409 extends substantially across the length and width of the tower 1 (e.g. the length and width of the top tower assembly 400). The roof 409 is connected to the upper side of the frame 406 of the top tower assembly 400. (Each of) the horizontal beams 408 extending across the width of top tower assembly may be attached to a respective vertical member 410 extending vertically upward from the midpoint of the horizontal beams 408. The roof 409 is supported along the centre-line of the width of the top tower assembly 400 by the top of these vertical members 410. The roof 409 slopes downward toward the periphery of the frame 408. Preferably, each of the vertical members 407 may have a respective horizontal member 411 attached thereto and extending outwardly in a direction perpendicular to the general plane of the side walls 4, 5 of the stack 3 so as to overhang the ground surface. These horizontal members 407 include horizontal members 322, 323. The roof 409 is attached to the outer periphery of the horizontal members 407, to increase coverage of the tower 1. The roof 409 is made from a flexible waterproof material such as waterproof cloth or plastic sheeting.

The tower 1 comprises a ladder 500 extending vertically from near the ground surface to the top tower assembly 400, for providing access to the top tower assembly 400. The ladder 500 is positioned on the first side wall 4 of the stack 3, and is positioned close enough to the first platform assembly 100 to allow a user to access the first platform 101 using the ladder 500. The ladder comprises a cage 501 for protecting the user climbing the ladder 500. The cage 501 may be attached to the ladder 500 and may extend from the top of the ladder 500 to a location higher than the first platform 101. The ladder 500 provides a path for the user to reach the first platform 101 and the third platform(s) 301.

The top of the ladder 500 may be adjacent to a portion of the top tower assembly 400 where the balustrade 405 is interrupted. There is a gate 502 here to prevent and allow access to the top of the ladder 500. The gate 502 can extend across the interruption of the balustrade 405. The gate 502 is hinged to the balustrade 405.

The tower 1 comprises a climbing wall 503. The climbing wall 503 is a façade that is attached to the second side wall 5 of the stack 3. The climbing wall 503 extends from the ground surface to the top of the stack 3. The climbing wall 503 extends along substantially the entirety of the length of the stack 3, i.e. from one end 6, 7 to the other 7, 6 of the stack 3. The climbing wall 503 comprises a plurality of hand/foot holds 504. The climbing wall 503 provides a path for the user to reach the second platform(s) 201 and the third platform(s) 301. The climbing wall 503 is constructed from a plurality of panels 505. The panels 505 are pre-fabricated and are arranged to form a complete climbing wall 503 when attached to the stack 3 and/or each other.

The tower 1 comprises an internal climbing path. The lowermost container 10 comprises a door 506 that provides and prevents access into the stack 3. The door 506 is a door as readily found on ISO containers. Inside each of the containers 10, 20, 30 is stair case (or set of steps) 507 connecting, and allowing access between: the floor 16 of the first container 10 and the floor 26 of the second container 20 (through the roof 15 of the first container 10); the floor 26 of the second container 20 and the floor 36 of the third container 30 (through the roof 25 of the second container 20); and the floor 36 of the third container 30 and the floor 404 of the top tower assembly 400 (through the roof 35 of the third container). There is a set of steps 507 associated with each container 10, 20, 30.

Figure 7:
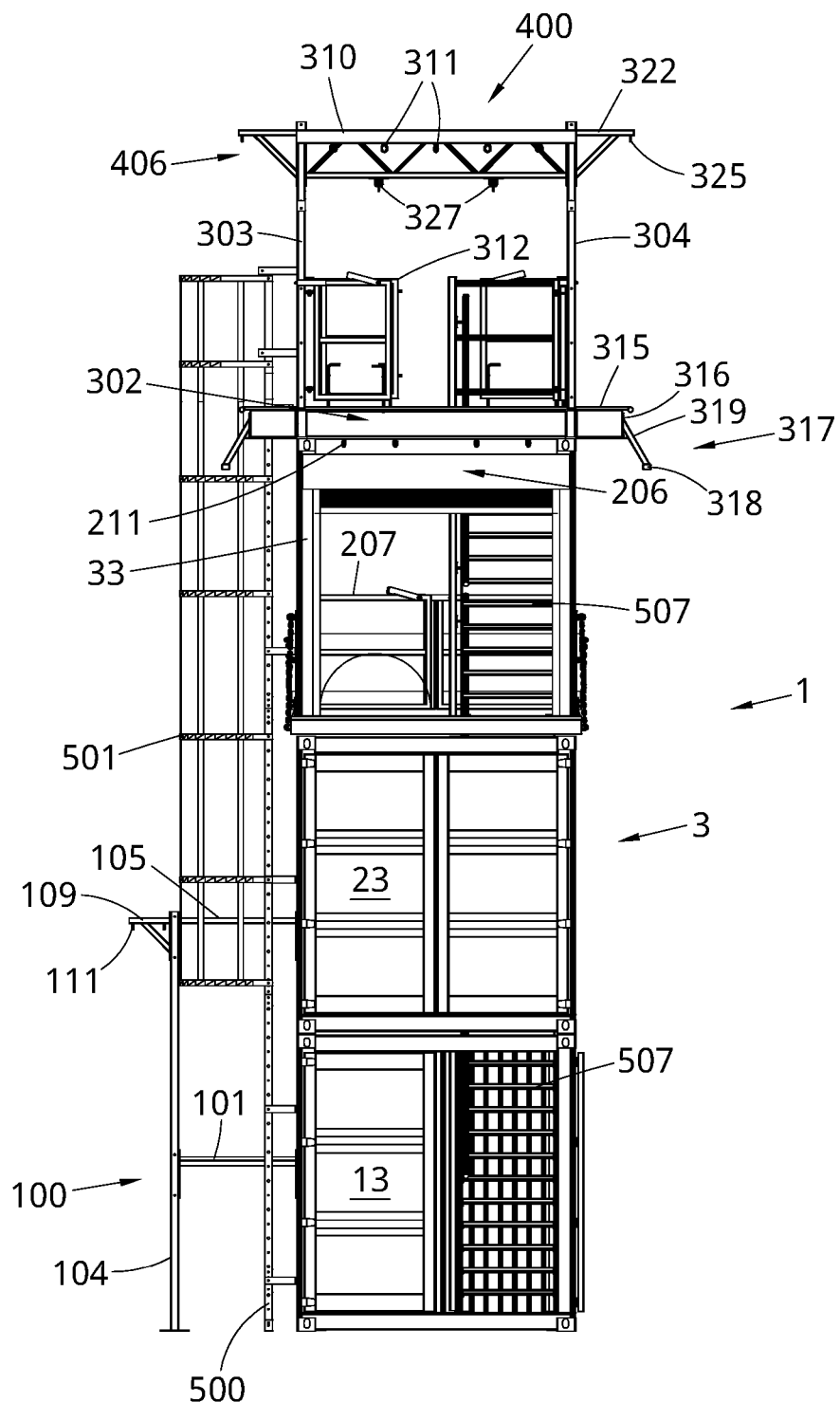
FIG. 7 shows an end-on view of another tower according to another embodiment of the present invention.
Figure 8:
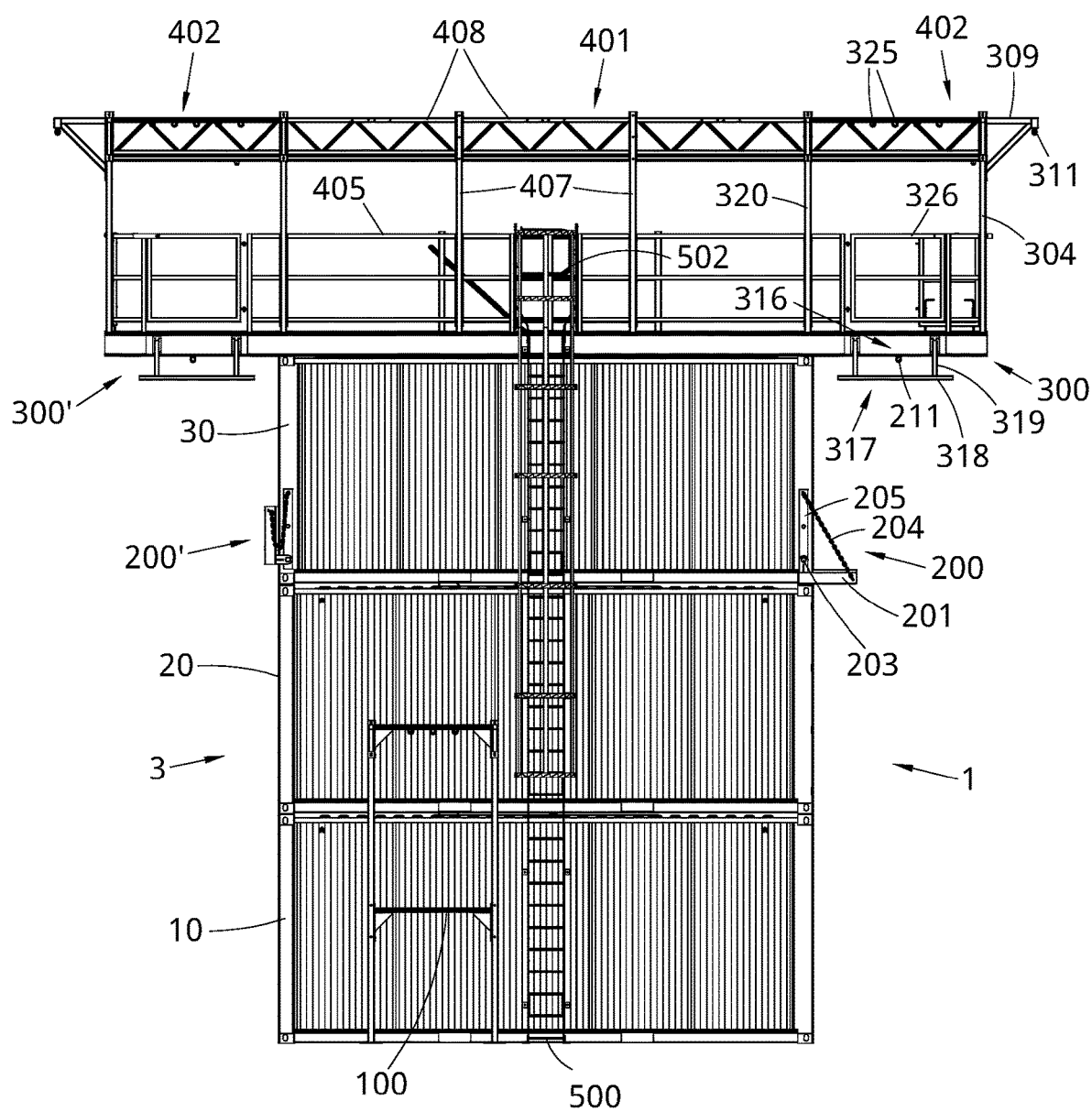
FIG. 8 shows a side-on view of the tower of FIG. 7.
Figure 9:
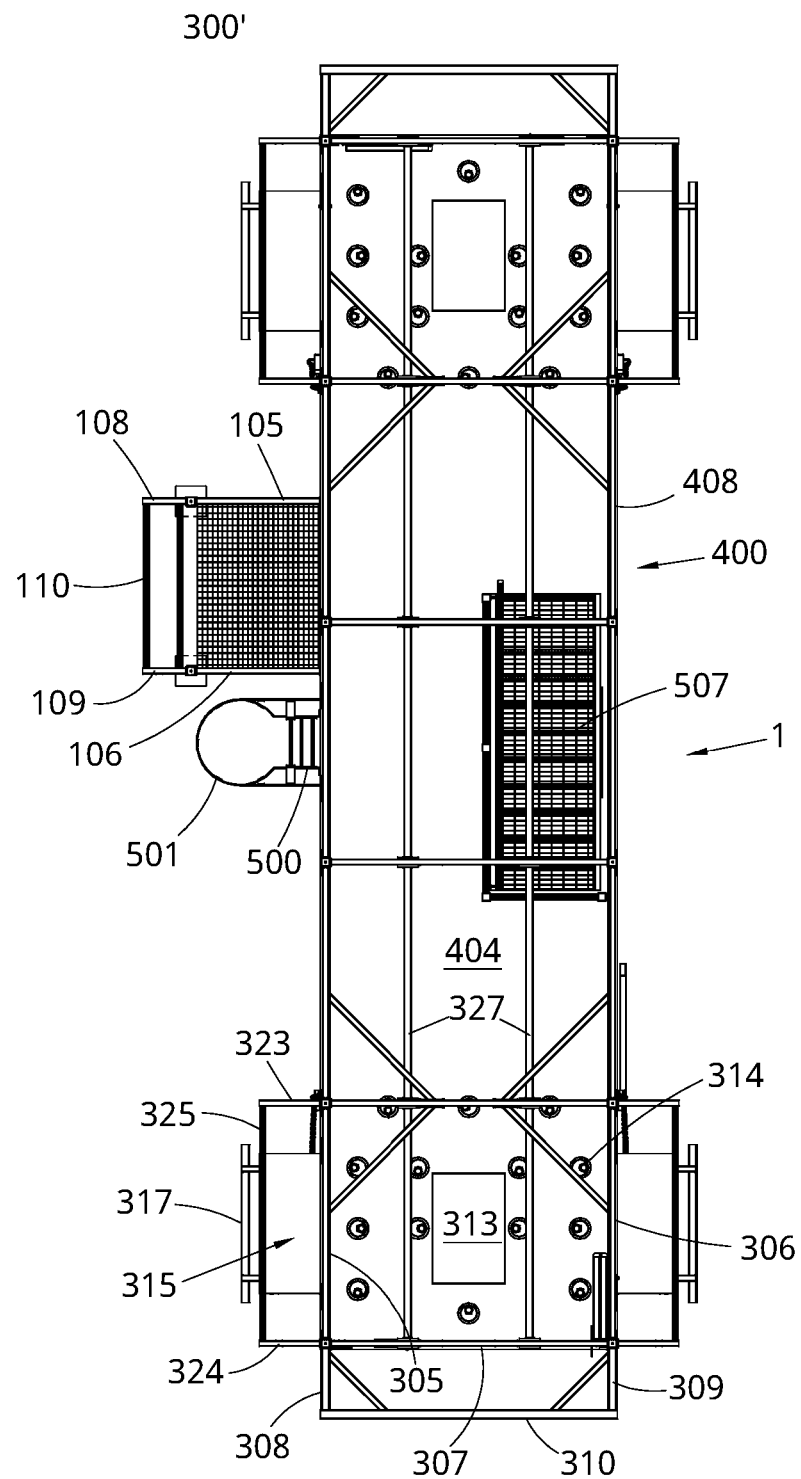
FIG. 9 shows a plan view of the tower of FIG. 7.

FIGS. 1 to 6 show different views of this same embodiment. FIGS. 7-8 show a very similar embodiment, identical in every way except that the tower does not have the roof 400 or horizontal members 411 or vertical members 410, or the climbing wall 503.

Figure 10:
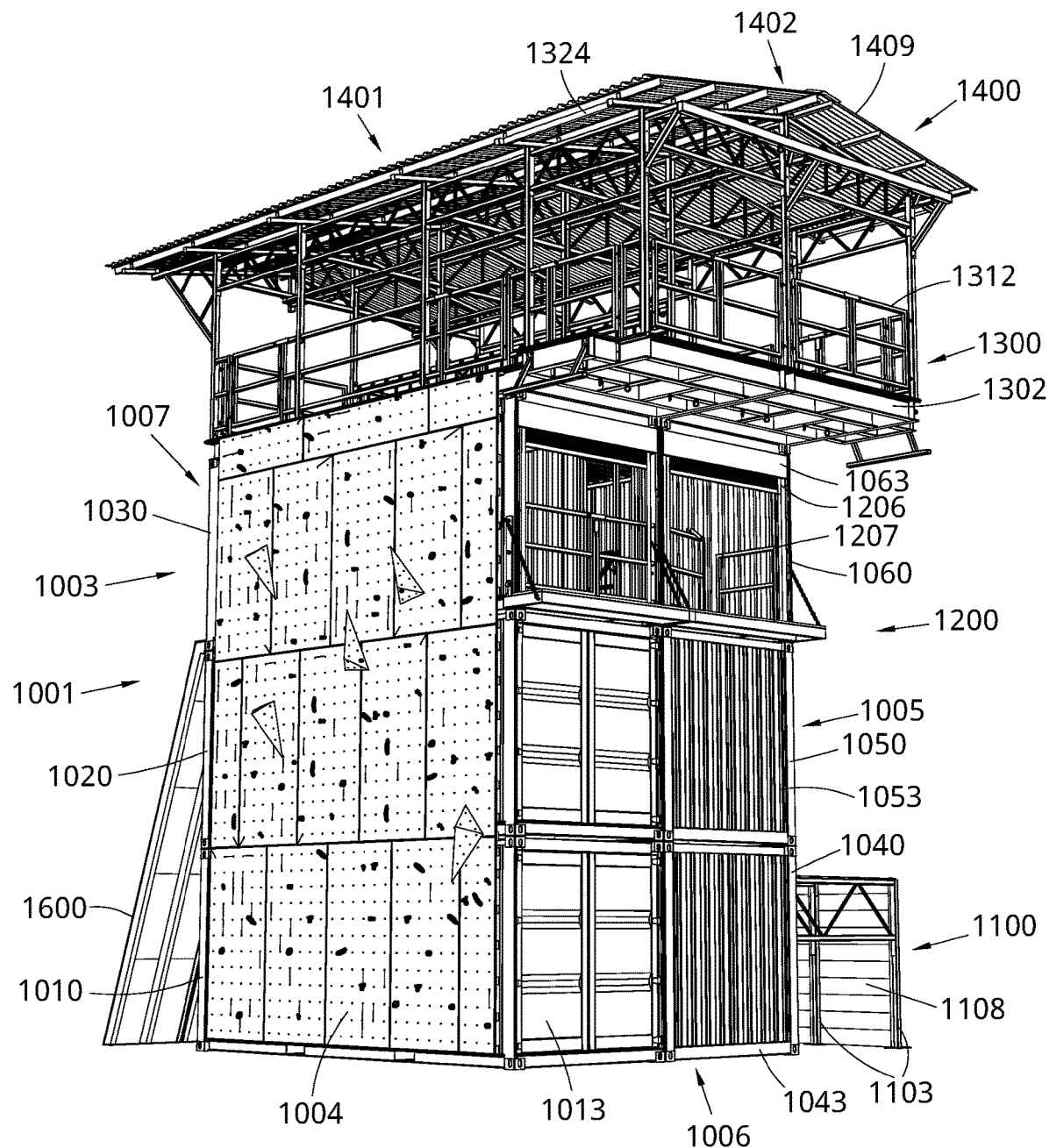
FIG. 10 shows a perspective view of another tower according to another embodiment of the present invention.
Figure 11:
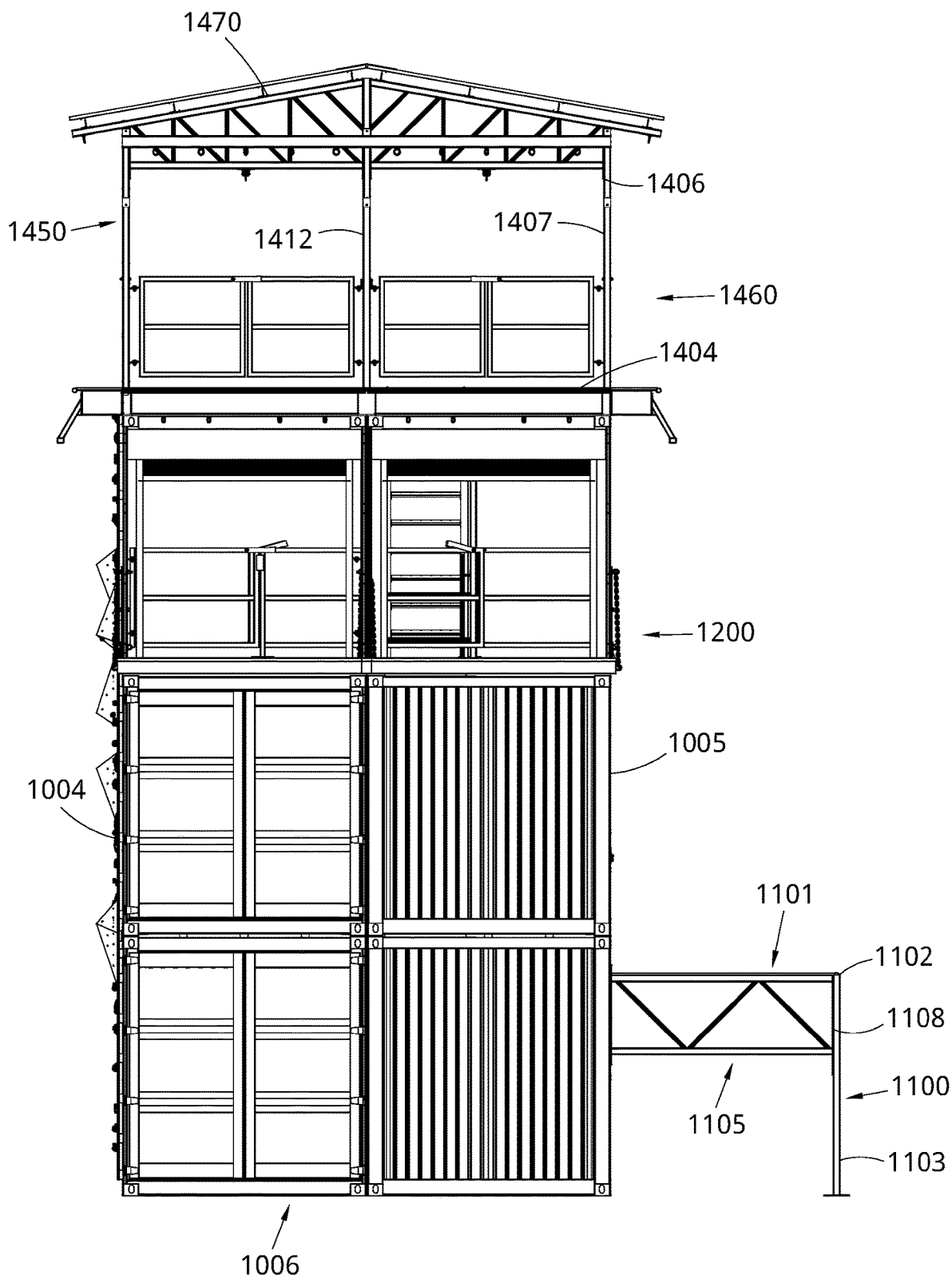
FIG. 11 shows an end-on view of the tower of FIG. 10.
Figure 12:
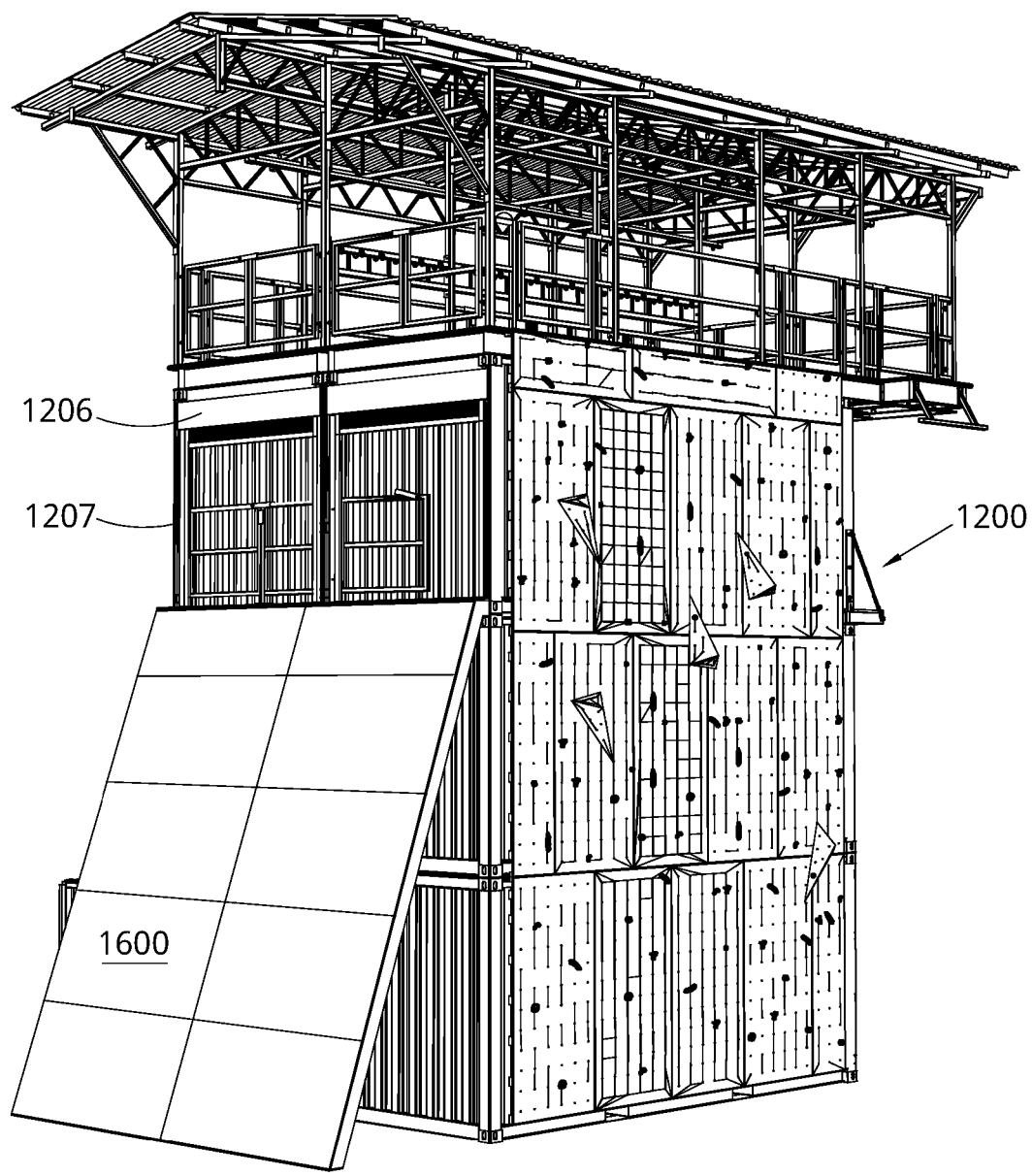
FIG. 12 shows another perspective view of the tower of FIG. 10.

FIGS. 10 to 12 show another embodiment of a tower 1001 according to the present invention. Except where discussed below, the tower 1001 is identical or at least largely similar to the tower 1.

Thus, the tower 1001 comprises a stack 1003 of ISO shipping containers 1010, 1020, 1030, 1040, 1050, 1060 and a plurality of platform assemblies 1100, 1200, 1300 configured for use in fast-rope training.

However, whereas the stack 3 of tower 1 was made by stacking single containers 10, 20, 30 one on top of the other, the tower 1001 is made of layers of containers 1010, 1020, 1030, 1040, 1050, 1060. Each layer comprises two containers 1010, 1020, 1030, 1040, 1050, 1060. The shipping containers 1010, 1020, 1030, 1040, 1050, 1060 of each layer are attached to each other such that respective side walls of the containers are adjacent each other (such that they face each other) and such that respective end walls 1013, 1023, 1033, 1043, 1053, 1063 are in line with each other. The respective shipping containers 1010, 1020, 1030, 1040, 1050, 1060 of a given layer are arranged horizontally with respect to each other. All the layers are made in a similar way, and are stacked on top of each other such that the side walls and the end walls of the containers 1010, 1020, 1030, 1040, 1050, 1060 form a vertical wall of the stack 1003. This forms a stack 1003 that has a width substantially equal to twice the width of an individual container, and a length substantially equal to the length of an individual container.

The stack 1003 may equally be thought of as two columns of containers 1010, 1020, 1030, 1040, 1050, 1060 placed adjacent each other such that the side walls of the respective containers 1010, 1020, 1030, 1040, 1050, 1060 are adjacent each other and such that the end walls are aligned.

The stack 3 is made of three layers of the shipping containers 1010, 1020, 1030, 1040, 1050, 1060 stacked vertically on top of one another. The containers are stacked such that the floor of the containers 1020, 1030, 1050, 1060 of an upper layer container rests and may be attached to the roof of the lower containers 1010, 1020, 1040, 1050; and such that lateral walls of the containers 1010, 1020, 1030, 1040, 1050, 1060 in a given column are in the same general planes; and the end walls of the containers are in the same general planes. In this way, the containers 1010, 1020, 1030, 1040, 1050, 1060 of a given column are stacked in an aligned arrangement, such that their peripheral walls and ends are aligned with each other.

A first layer is arranged on the ground surface (not shown). A second layer is arranged on the first layer. A third layer is arranged on the second layer. The aligned lateral side walls of containers 1010, 1020, 1030 thus generally form a first lateral side wall 1004 of the stack 1003. The aligned lateral side walls of containers 1040, 1050, 1060 thus generally form a second lateral side wall 1005 of the stack 1003. The aligned ends of the containers 1010, 1020, 1030, 1040, 1050, 1060 thus generally form a first end 1006 and a second end 1007 of the stack 1003. The aligned second ends 14, 24, 34 thus generally form a second end 7 of the stack.

The tower 1 comprises a first platform assembly 1100. The first platform assembly 1100 is an external wall 1005 platform assembly. The first platform assembly 1100 comprises a first platform 1101 that is attached to an external side wall of container 1040. The first platform 1101 is an external wall platform. The first platform 1101 extends horizontally outward from the external side wall of the stack 1003. The first platform 1101 overhangs the ground surface. The first platform 1101 is general rectangular and has horizontal width (i.e. the distance it extends from the stack 1003) of around 1-3 m (preferably 2-2.5 m), and a horizontal length (i.e. the distance it runs parallel to the length of the stack/containers) substantially equal to the stack/containers. The first platform 1101 is between 1-3 m above the ground surface. The first platform 1101 comprises an outer edge 1102 that is horizontal and runs parallel to the external wall of the stack. The outer edge 1102 is the laterally outermost edge of the platform 1101 when viewed from above.

At the outermost edge 1102, the platform 1101 is supported by a plurality of vertical members 1103 that extend to the ground surface and contact the ground via ground engaging plates. The tops of each of the vertical members 103, 104 are attached to respective horizontal members 1105 the external wall 1005 of the stack 1003 and attach to the lateral side wall of the container 1040.

Between the outermost edge 1102 and the ground, there extends a vertical wall 1108. This may be used as a climbing or abseiling wall. This wall 1108 is supported by the vertical members 1103.

The tower 1001 comprises a second platform assembly 1200. This is substantially identical to the second platform assembly 200 except that there are essentially two platform assemblies 200 next to each other, one in the end wall 1033 of a first upper container 1030 and one in the end wall of a second upper container 1060 adjacent to the first upper container (both said containers being in the same layer). The two platforms 201 next to each other effectively form one larger platform.

There may be another second platform assembly, which is substantially identical to second platform assembly 1200, located at the other end of the container stack 1003. However, in the embodiment of FIGS. 10-12, at the other end of the stack 1003, there is instead a climbing wall 1600. The climbing wall 1600 is non-vertical and extends from the ground surface to the floor of the upper layer (the floor of upper containers 1030, 1060). The wall 1600 has a width such that it extends across the width of the stack 1003. The ends of the containers 1030, 1060 proximate the wall 1600 each comprise respective doors 1206 for accessing the wall 1600 (substantially identical to door 206) and gates 1207 for accessing the wall 1600 (substantially identical to the gate 1207). The tower 1001 may comprise ropes for climbing up or abseiling down the wall 1600.

It should be understood that the second platform assembly/assemblies 1200 and/or the wall 1600 may additionally/alternatively be located in the second layer containers 1020, 1050, or indeed any container that is not resting on the ground surface.

The tower 1001 comprises a third platform assembly 1300. The third platform assembly 1300 is substantially identical to the third platform assembly 300 except that it extends across the width of two containers in the stack 1003 (i.e. it is wider). Further, it may comprise two hatches 1313, and may comprise an additional gate 1312. The outer peripheral edge 1302 of the third platform assembly 1300 is approximately twice the width of edge 302, i.e. it extends substantially across the width of the stack 1003. As is explained below in more detail, the third platform assembly 1300 is formed of two symmetrical portions that are fixed to each other. The horizontal beam 1324 is supported by angled (between horizontal and vertical) members 1470 that are in turn supported by vertical members 1407, 1412 as discussed below.

The tower 1001 further comprises a top tower assembly 1400. The top tower assembly 1400 is substantially identical to the top tower assembly 400 except that it extends across the width of two containers in the stack 1003 (i.e. it is wider). Further, the top tower assembly 1400 forms only one third platform assembly 1300, instead of two third platform assemblies 300, 300'. Further, the top tower assembly 1400 is constructed of two portions 1450, 1460, which are substantially symmetrical. The two portions have a width substantially equal to the width of a container 1010, 1020, 1030, 1040, 1050, 1060, and length greater than the length of a container 1010, 1020, 1030, 1040, 1050, 1060. The two portions 1450, 1460 are attached to one another along their length to form the top tower assembly 1400.

The first portion 1401 overlaps with the stack 1003 and the second portion 1402 overhangs the ground surface thus forming the third platform assembly 1300. There may be no overhang of the floor portion 1404 over the wall 1600, as there may not be a third platform assembly above the wall 1600.

The frame 1406 is constructed of vertical members 1407 extending from the periphery of the floor portion 1404 and vertical members 1412 at the centre line of the floor portion 1404 (i.e. at the location where the two portions 1450 and 1460 meet, e.g. directly above where side walls of the containers 1010, 1020, 1030, 1040, 1050, 1060 meet). The vertical members 1412 are longer than the vertical members 1407. Connecting the tops the vertical members 1412 to respective vertical members 1407 are angled members 1470. The angled members 1470 extend at an angle between the vertical and the horizontal and in a direction parallel to the width of the stack 1003. The angled members 1470 extend beyond the side walls 1004, 1005 of the stack 1003.

The two portions 1450, 1460 are pre-fabricated modules, which are attached together and placed on top of and attached to the stack 1003.

The roof 1409 is supported by the angled members 1470. The roof 1409 is made of a rigid material, such as corrugated plastic or metal. The roof 1409 extends beyond the side walls 1004, 1005 of the stack 1003, covers the third platform assembly 1300 and overhangs the wall 1600.

On the inside of the stack 1003, the containers 1010, 1020, 1030, 1040, 1050, 1060 may comprise openings in their walls/roofs/floors to allow users to move between the containers of the stack 1003 as desired.

Figure 13:
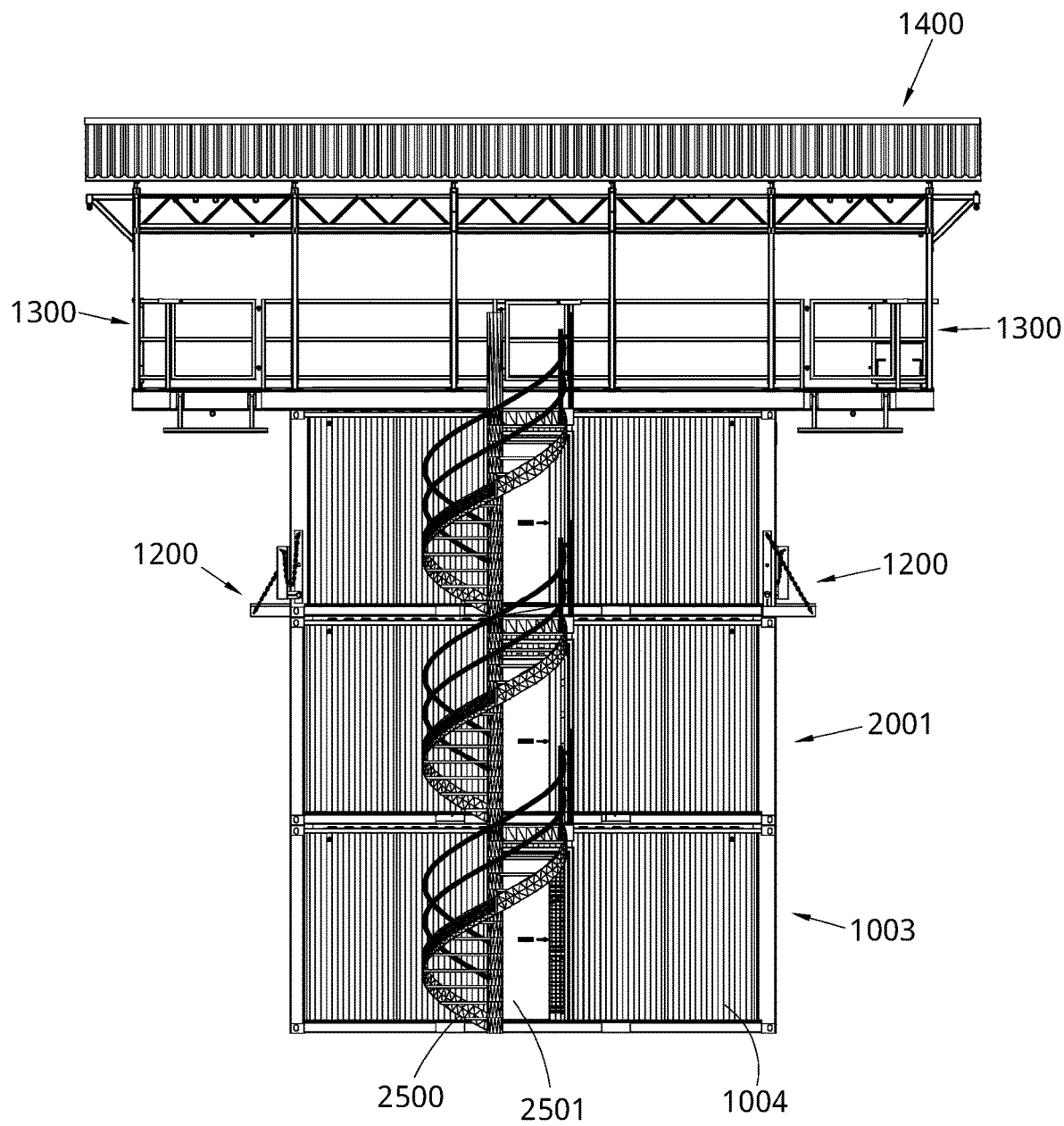
FIG. 13 shows a side-on view of another tower according to another embodiment of the present invention.
Figure 14:
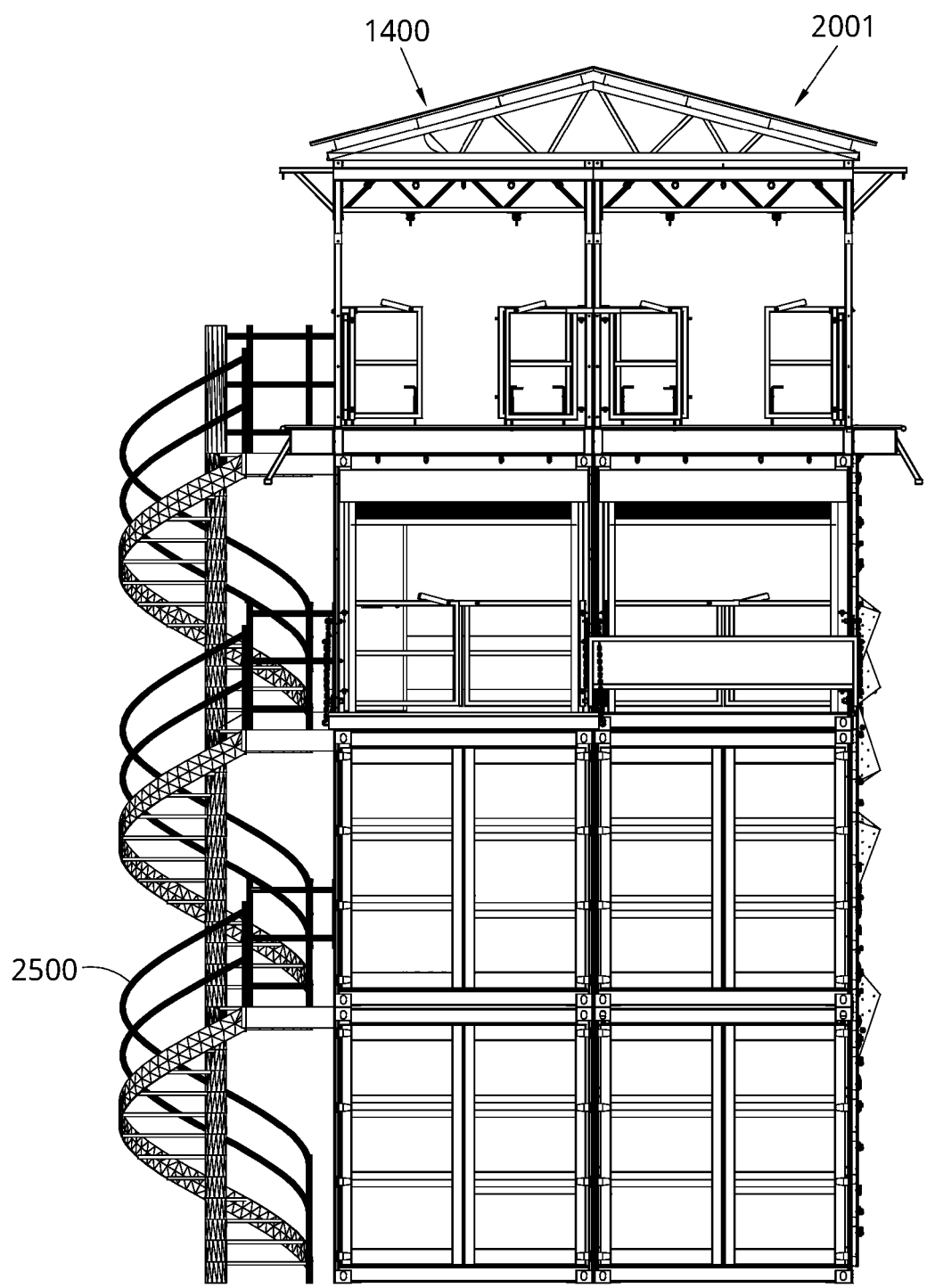
FIG. 14 shows an end-on view of the tower of FIG. 13.

FIGS. 13 to 14 show another embodiment of a tower 2001 according to the present invention. Except where discussed below, the tower 2001 is identical or at least largely similar to the tower 1001.

The tower 2001 comprises two third platform assemblies 1300 and two second platform assemblies 1200, one of each being located on each of the ends 1006, 1007 of the stack 1003. There is no wall 1600 or first platform assembly 1100. However, the tower 2001 comprises a staircase 2500 extending from the ground surface to the top tower assembly 1400, for providing access to the top tower assembly 1400. The staircase 2500 is a spiral staircase. The stack 1003 comprises doors 2501 in the side wall 1004 of the stack 1003. The doors 2501 and the staircase 2500 are arranged such that the staircase 2500 provides access to the doors 2501. Each of the containers 1010, 1020, 1030 that make up the side wall 1004 comprises a door 2501. Each door 2501 provides access through the side wall of a given container 1010, 1020, 1030.

The skilled person would immediately appreciate that different combinations of the above-discussed features are possible without departing from the scope of the invention. Whilst there may be particularly preferable combinations of features, any combination of ladders, stairs, climbing walls, ropes, platforms, containers, top tower assemblies may be used.

The invention claimed is:

1. A fast-rope training apparatus comprising:
   a platform-supporting structure comprising a plurality of containers;
   at least one platform configured for use in fast-rope training; and
   at least one attachment for attaching a fast-rope, wherein the platform-supporting structure is supportable by a surface, and wherein the at least one attachment is located higher than the at least one platform and spaced laterally from the platform-supporting structure such that the at least one attachment overhangs the surface so a fast-rope can hang from the at least one attachment, past the at least one platform and toward the surface, and
   wherein the plurality of containers are pre-fabricated containers each having its own structural integrity prior to construction of the platform-supporting structure.

2. The training apparatus as claimed in claim 1, wherein the training apparatus is free-standing.

3. The training apparatus as claimed in claim 1, wherein the platform-supporting structure comprises an uppermost portion, and the at least one platform comprises an uppermost portion-level platform at substantially the same height as the uppermost portion.

4. The training apparatus as claimed in claim 1, wherein at least one of the plurality of containers comprises a floor, and the at least one platform comprises a floor-level platform at substantially the same height as said floor.

5. The training apparatus as claimed in claim 1, wherein the platform-supporting structure comprises an external wall, and the at least one platform comprises an external wall platform that is attached to and supported by the external wall.

6. The training apparatus as claimed in claim 1, wherein the at least one platform comprises at least one hatch.

7. The training apparatus as claimed in claim 1, wherein the at least one platform comprises at least one skid.

8. The training apparatus as claimed in claim 1, further comprising a gate configured to optionally block a user's pathway to the at least one platform or to an edge of the at least one platform.

9. The training apparatus as claimed in claim 1, further comprising an anchor device for securing a user to the training apparatus in order to prevent the user falling from the at least one platform.

10. The training apparatus as claimed in claim 9, wherein the anchor device is located above the at least one platform.

11. The training apparatus as claimed in claim 1, further comprising climbing equipment for accessing the at least one platform.

12. The training apparatus as claimed in claim 11, wherein the climbing equipment comprises a climbing wall.

13. The training apparatus as claimed in claim 1, wherein the platform-supporting structure comprises an uppermost portion and the training apparatus further comprises a top training apparatus assembly arranged on the uppermost portion of the platform-supporting structure and comprising a first portion that at least partially overlaps with the platform-supporting structure and a second portion that overhangs the surface thus forming the at least one platform.

14. The training apparatus as claimed in claim 1, wherein the platform-supporting structure has a width substantially equal to the width of a single one of said plurality of containers.

15. The training apparatus as claimed in claim 1, wherein the platform-supporting structure has a width greater than the width of a single one of said plurality of containers.

16. The training apparatus as claimed in claim wherein the plurality of containers are ISO shipping containers.

17. A fast-rope training apparatus comprising:
   a platform-supporting structure comprising a plurality of containers;
   at least one platform configured for use in fast-rope training,
   wherein the platform-supporting structure is supportable by a surface,
   wherein the at least one platform extends outward from the platform-supporting structure such that the at least one platform overhangs the surface;
   wherein the at least one platform comprises at least one skid; and
   wherein the skid comprises a generally horizontal bar running parallel with an adjacent edge of the platform, the horizontal bar being lower than a surface of the platform and spaced laterally outward from the adjacent edge.

* * * * *